US009712750B2

(12) United States Patent
Kinoshita

(10) Patent No.: US 9,712,750 B2
(45) Date of Patent: Jul. 18, 2017

(54) DISPLAY CONTROL DEVICE AND ASSOCIATED METHODOLOGY OF IDENTIFYING A SUBJECT IN AN IMAGE

(71) Applicant: SONY CORPORATION, Minato-ku (JP)

(72) Inventor: Masaya Kinoshita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/380,222

(22) PCT Filed: Mar. 7, 2013

(86) PCT No.: PCT/JP2013/056281
§ 371 (c)(1),
(2) Date: Aug. 21, 2014

(87) PCT Pub. No.: WO2013/153883
PCT Pub. Date: Oct. 17, 2013

(65) Prior Publication Data
US 2015/0070526 A1 Mar. 12, 2015

(30) Foreign Application Priority Data
Apr. 9, 2012 (JP) ................. 2012-088246

(51) Int. Cl.
*H04N 5/232* (2006.01)
*G03B 17/18* (2006.01)

(52) U.S. Cl.
CPC ..... *H04N 5/23293* (2013.01); *H04N 5/23216* (2013.01); *H04N 5/23219* (2013.01); *H04N 5/23229* (2013.01); *G03B 17/18* (2013.01)

(58) Field of Classification Search
None
See application file for complete search history.

(56) References Cited

U.S. PATENT DOCUMENTS

2006/0210264 A1* 9/2006 Saga ...................... G03B 13/30
396/287
2008/0008361 A1* 1/2008 Nozaki .................. H04N 5/232
382/118

(Continued)

FOREIGN PATENT DOCUMENTS

JP     2005-80195 A    3/2005
JP     2008-119071 A   5/2008

(Continued)

OTHER PUBLICATIONS

International Search Report issued Apr. 2, 2013 in PCT/JP2013/056281.

(Continued)

*Primary Examiner* — Justin P Misleh
(74) *Attorney, Agent, or Firm* — Oblon, McClelland, Maier & Neustadt, L.L.P.

(57) ABSTRACT

Provided is a display control device including circuitry that performs a display image data process that is an image data process for display on image data that is a target of a main subject determination process such that at least candidate presentation for a candidate image set as a candidate for a main subject in the main subject determination process based on candidate image information and main subject presentation based on main subject information of a determination result of the main subject determination process are performed in different display forms. The circuitry also outputs processed image data to be supplied to a display.

8 Claims, 24 Drawing Sheets

(56) References Cited

U.S. PATENT DOCUMENTS

| | | | |
|---|---|---|---|
| 2008/0118156 A1 | 5/2008 | Okada | |
| 2008/0317285 A1* | 12/2008 | Abe | H04N 5/23216 382/103 |
| 2009/0115864 A1* | 5/2009 | Ogawa | G06K 9/00248 348/222.1 |
| 2010/0007763 A1 | 1/2010 | Yokohata | |
| 2010/0150450 A1* | 6/2010 | Tsuji | H04N 5/232 382/195 |
| 2011/0002678 A1* | 1/2011 | Misawa | G03B 7/00 396/63 |
| 2012/0206619 A1* | 8/2012 | Nitta | H04N 5/23219 348/222.1 |

FOREIGN PATENT DOCUMENTS

| | | |
|---|---|---|
| JP | 2009-38749 A | 2/2009 |
| JP | 2009-218915 | 9/2009 |
| JP | 2010-154187 A | 7/2010 |
| JP | 2011-55272 A | 3/2011 |
| JP | 2011-146826 A | 7/2011 |
| JP | 2011-146827 A | 7/2011 |
| JP | 2011-160379 A | 8/2011 |
| JP | 2011-166305 A | 8/2011 |
| JP | 2013012993 A * | 1/2013 |

OTHER PUBLICATIONS

Extended European Search Report issued Sep. 4, 2015 in Patent Application No. 13775056.8.
Office Action issued Jan. 5, 2017 in Chinese Patent Application No. 201380018303.X (with English-language Translation).
Office Action issued Oct. 18, 2016 in Japanese Patent Application No. 2014-510076.
Japanese Office Action issued Apr. 5, 2016, for Japanese Patent Application 2014-510076.

* cited by examiner

FIG. 6
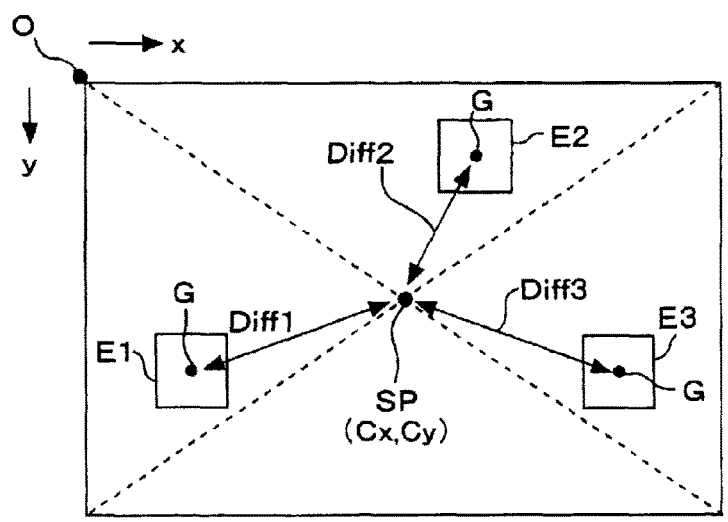
A
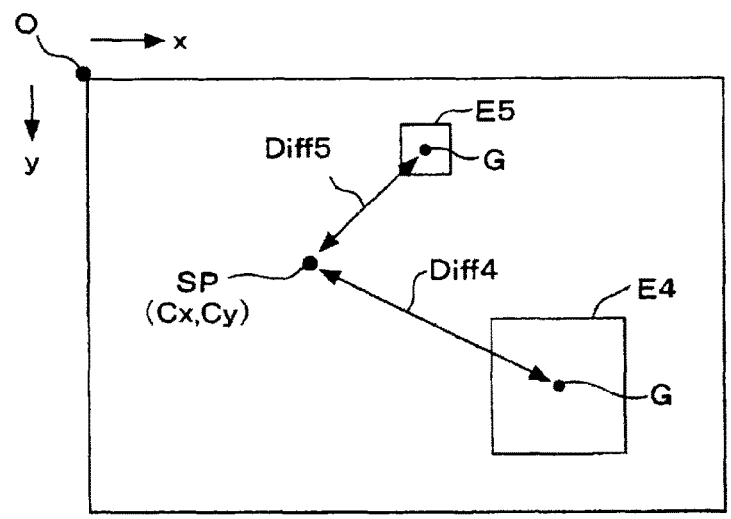
B

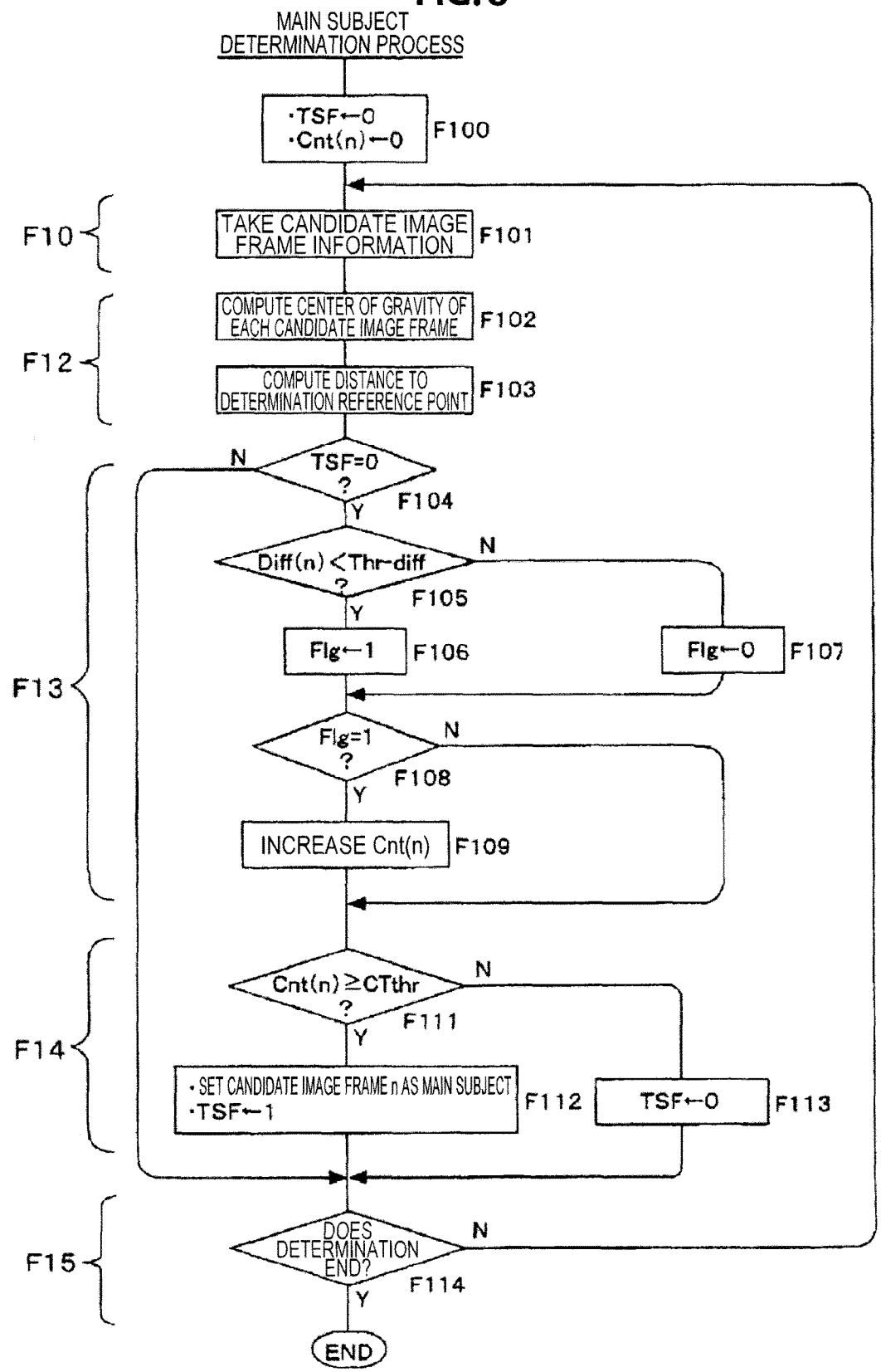

FIG. 9

| MAIN SUBJECT DETERMINATION SESSION | MAIN SUBJECT DECISION TIME | POST MAIN SUBJECT DECISION SESSION |
|---|---|---|
| X1 NO CANDIDATE PRESENTATION | Y1 ONLY MAIN SUBJECT PRESENTATION | Z1 NO MAIN SUBJECT PRESENTATION |
| X2 CANDIDATE PRESENTATION | Y2 MAIN SUBJECT AND NON-SELECTED CANDIDATE PRESENTATION | Z2 MAIN SUBJECT PRESENTATION |
| X3 (X3-1) CANDIDATE PRESENTATION → (X3-2) POTENTIAL CANDIDATE PRESENTATION | | Z3 MAIN SUBJECT AND NON-SELECTED CANDIDATE PRESENTATION |

FIG. 13
A 
B   
RED     BLUE     WHITE
C 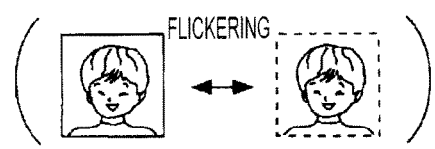
D  TRANSLUCENTLY PAINTED FRAME/HIGH LUMINANCE FRAME
E   
F  

FIG. 14
A
IMAGE
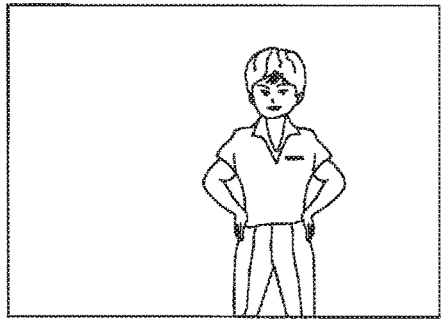
B
SUBJECT MAP
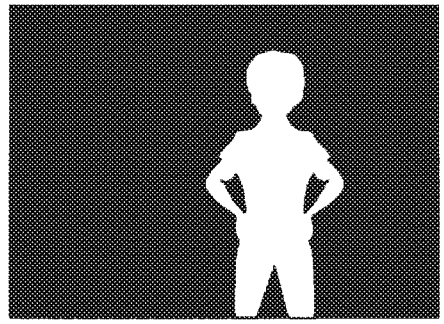
C
(AREA PRESENTATION I)
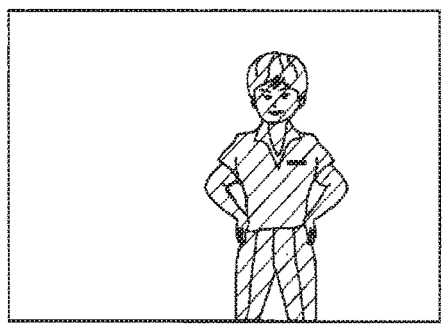
PROCESSING OF
MAIN SUBJECT AREA
D
(AREA PRESENTATION II)
PROCESSING OF AREA OTHER
THAN MAIN SUBJECT AREA
E
(AREA PRESENTATION III)
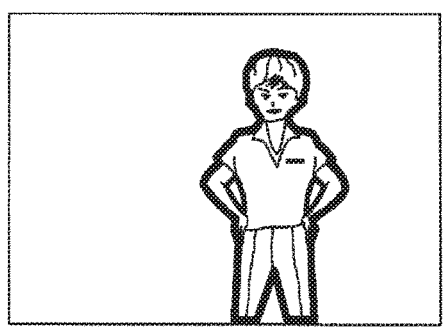
ADDITION OF CONTOUR
F
(AREA PRESENTATION IV)
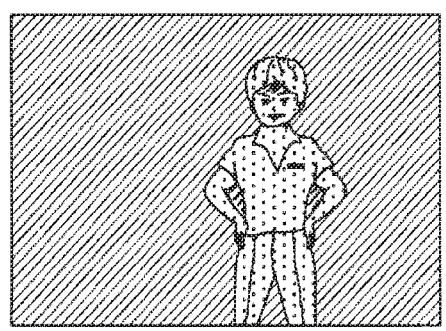
DIFFERENT PROCESSING ON MAIN
SUBJECT AREA AND REMAINING AREA

DISPLAY DATA PROCESS OF Y1 (F207)

- F231: SET PRESENTATION POSITION BASED ON MAIN SUBJECT INFORMATION
- F232: GENERATE DISPLAY DATA FRAME BY ADDING MAIN SUBJECT PRESENTATION IN SECOND FORM TO CURRENT CAPTURED IMAGE DATA FRAME

B

DISPLAY DATA PROCESS OF Y2 (F207)

- F235: SET PRESENTATION POSITION BASED ON MAIN SUBJECT INFORMATION AND CANDIDATE IMAGE FRAME INFORMATION
- F236: GENERATE DISPLAY DATA FRAME BY ADDING MAIN SUBJECT PRESENTATION IN SECOND FORM AND CANDIDATE IMAGE PRESENTATION IN FIRST FORM TO CURRENT CAPTURED IMAGE DATA FRAME

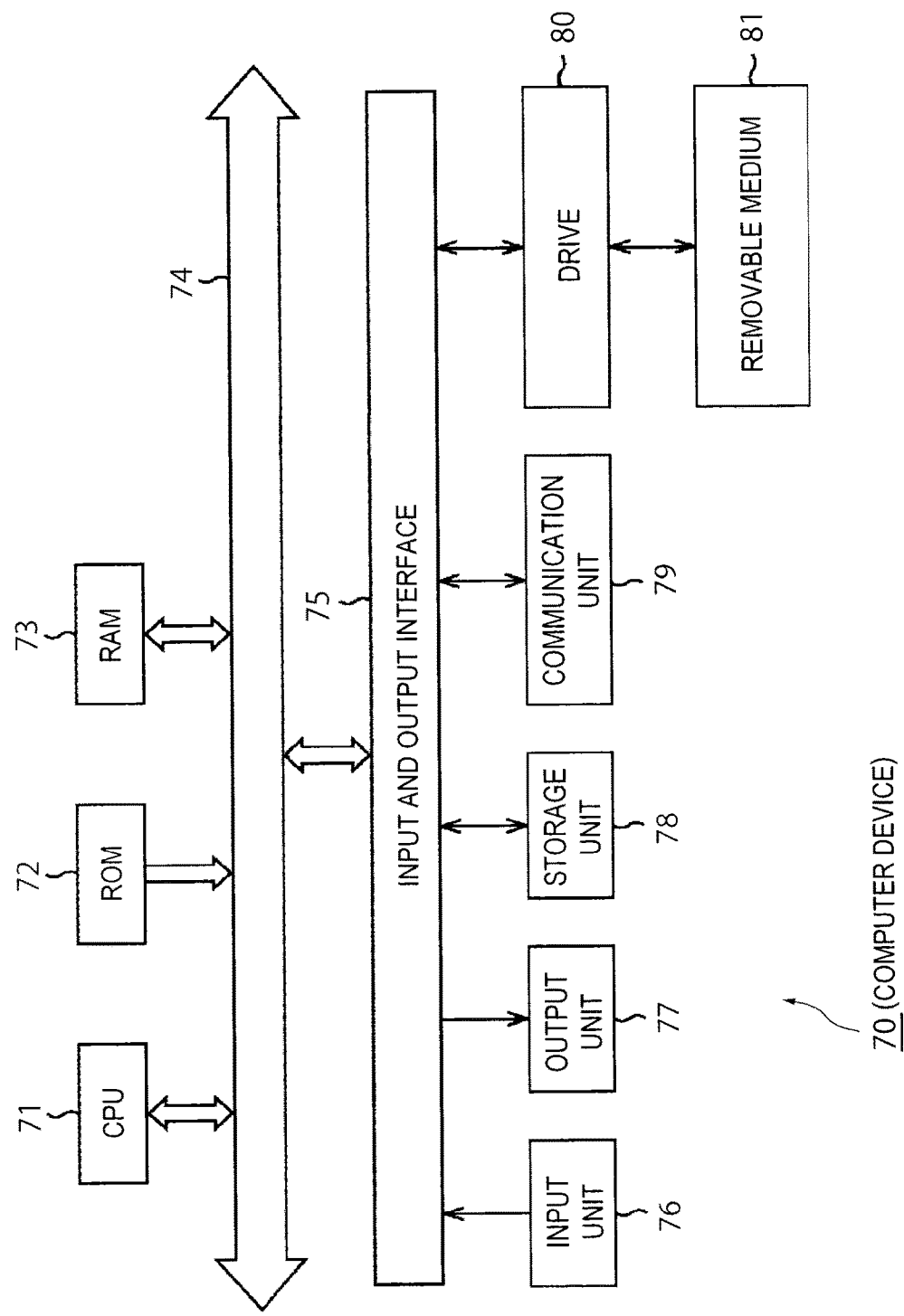

DISPLAY CONTROL DEVICE AND ASSOCIATED METHODOLOGY OF IDENTIFYING A SUBJECT IN AN IMAGE

TECHNICAL FIELD

The present disclosure relates to a display control device, a display control method, and a program, and particularly to display control for determining a main subject in an image.

BACKGROUND ART

Recent digital still cameras and digital video cameras normally have a facial detection function, and have a function of optimally matching various parameters (focus, brightness and the like) of the camera according to facial position and area.

In addition, Patent Literature 1 discloses a technique in which a user designates and selects a "main subject" that is a target subject to be tracked in a captured image.

In addition, if the techniques disclosed in Patent Literatures 2, 3, and 4 described above are used, for example, subject tracking that encompasses a frame of the whole body of an arbitrary subject can be realized.

In addition, there are also functions of controlling an optical system and the like such as autofocus and automatic exposure such that a desired area in a captured image is detected and traced so as to optimize the area.

As described above, technologies of tracking an image designated by a user as a main subject, for example, an image area such as a face in a captured image, focusing on the face area, and the like are known.

CITATION LIST

Patent Literature

Patent Literature 1: JP 2011-166305A
Patent Literature 2: JP 2011-146826A
Patent Literature 3: JP 2011-146827A
Patent Literature 4: JP 2011-160379A

SUMMARY OF INVENTION

Technical Problem

However, in a captured image, a desired area that is subject to tracking or focusing, i.e., a "main subject," is decided by a photographer by directly selecting one candidate from "a plurality of candidate areas" obtained from various detectors using any method at present.

In a state of holding a camera, for example, a main subject is chosen through an action of selecting an arbitrary face from a plurality of faces projected on a through image displayed on a screen (a monitoring image of a subject displayed at times other than at a time of manipulating a shutter) on a touch panel. Alternatively, a subject present in a predetermined area is set to be a main subject at a time designated by a user (half-pressing of a shutter or the like).

However, when such a user interface is considered in actual use examples, there are cases in which the action of "selecting a main subject by a photographer" itself is difficult.

For example, when a user wants to use a function of maintaining focus on a subject that is moving around, it is difficult for the user to select the subject holding a camera while targeting the subject.

For example, there are cases in which designation is difficult due to a speed of a reaction of a user to changes (movements) of a subject. For example, there is a case in which it is difficult to precisely designate a subject that is moving around on a screen of a through image.

In addition, in a situation in which a user holds a camera in his or her hand in the first place and turns the camera toward the subject to choose the subject, it is difficult for the user to perform the action of selecting a main subject using his or her finger on a screen.

In addition, there is a case in which it is difficult for a use to select a subject in resolution of a display screen in which a touch panel is arranged.

In addition, there is also a case in which it is difficult to properly designate a desired subject depending on a size of the subject on a display screen in which a touch panel is arranged and a size (thickness) of a user's finger.

In addition, there is also a case in which it is difficult for a user to properly designate a subject due to a time lag of a camera system, for example, a time lag between actual scenery and a through image of a captured image.

Furthermore, when such a designation manipulation is to be performed during imaging and recording of a dynamic image, image shaking caused by an action of selecting a main subject may be recorded as it is, or a user may be required for an action of re-selection at the time of frame-out or tracking loss (failure) caused by temporary shielding, or the like.

As described above, the action of selecting a main subject itself is difficult in many use cases of hand-held type cameras that require the function, which causes stress for photographers.

Thus, on the assumption that a target subject that a user such as a photographer desires is set to be determined as a main subject at a proper time even if the user does not perform an intentional action of selecting the subject, the present disclosure aims to enable the user to accurately recognize the result and the course of the determination of the main subject.

Solution to Problem

A display control device according to the present disclosure includes a display image processing unit configured to perform a display image data process that is an image data process for display on image data that is a target of a main subject determination process such that at least candidate presentation for a candidate image set as a candidate for a main subject in the main subject determination process based on candidate image information and main subject presentation based on main subject information of a determination result of the main subject determination process are performed in different display forms, and a display data output unit configured to output image data processed by the display image processing unit as display data to be supplied to a display unit.

A display control method according to the present disclosure includes acquiring at least candidate image information on a candidate image set as a candidate for a main subject in a main subject determination process and main subject information of a determination result of the main subject determination process, performing an image data process for display on image data that is a target of the main subject determination process such that candidate presentation based on the candidate image information and main subject presentation based on the main subject information are performed in different display forms, and outputting image data obtained through the image data process for display as display data to be supplied to a display unit.

A program according to the present disclosure causes an arithmetic operation processing device to execute an image data process for display performed on image data that is a target of a main subject determination process such that candidate presentation based on candidate image information and main subject presentation based on main subject information are performed in different display forms, and a process of outputting image data obtained through the image data process for display as display data to be supplied to a display unit.

According to the technology of the present disclosure, when the main subject determination process for automatically determining a main subject is performed on image data, a candidate image under determination and the main subject are clearly presented to a user as a determination result in different forms.

Advantageous Effects of Invention

According to the present disclosure, when the main subject determination process for automatically determining a main subject is performed on image data, a candidate image under determination and the main subject are presented to a user as a determination result in different forms, and thus the user can have clear recognition with respect to the automatic process and accordingly usability can be improved.

BRIEF DESCRIPTION OF DRAWINGS

FIG. 6 is an illustrative diagram of candidate image frames and distances between determination reference points of an embodiment.

FIG. 8 is a flowchart of a specific main subject determination process of an embodiment.

FIG. 9 is an illustrative diagram of display states of each of time points of an embodiment.

FIG. 13 is an illustrative diagram of various presentation forms of an embodiment.

FIG. 14 is an illustrative diagram of various presentation forms of an embodiment.

FIG. 18 is a flowchart of the display data process in a main subject decision time of the embodiment.

FIG. 24 is a block diagram of a case of application of an embodiment to a computer device.

DESCRIPTION OF EMBODIMENTS

Hereinafter, embodiments will be described in the following order.
<1. Configuration of a display control device>
<2. Configuration of an imaging apparatus>
<3. Main subject determination process>
<4. Display control process>
 [4-1: Example of display control at each time point]
 [4-2: Display forms of main subject presentation and candidate presentation]
 [4-3: First example of the display control process]
 [4-4: Second example of the display control process]
 [4-5: Process for area presentation (use of a subject extraction map)]
<5. Application to a program and a computer device>
<6. Modified example>

1. Configuration of a Display Control Device

Figure 1:
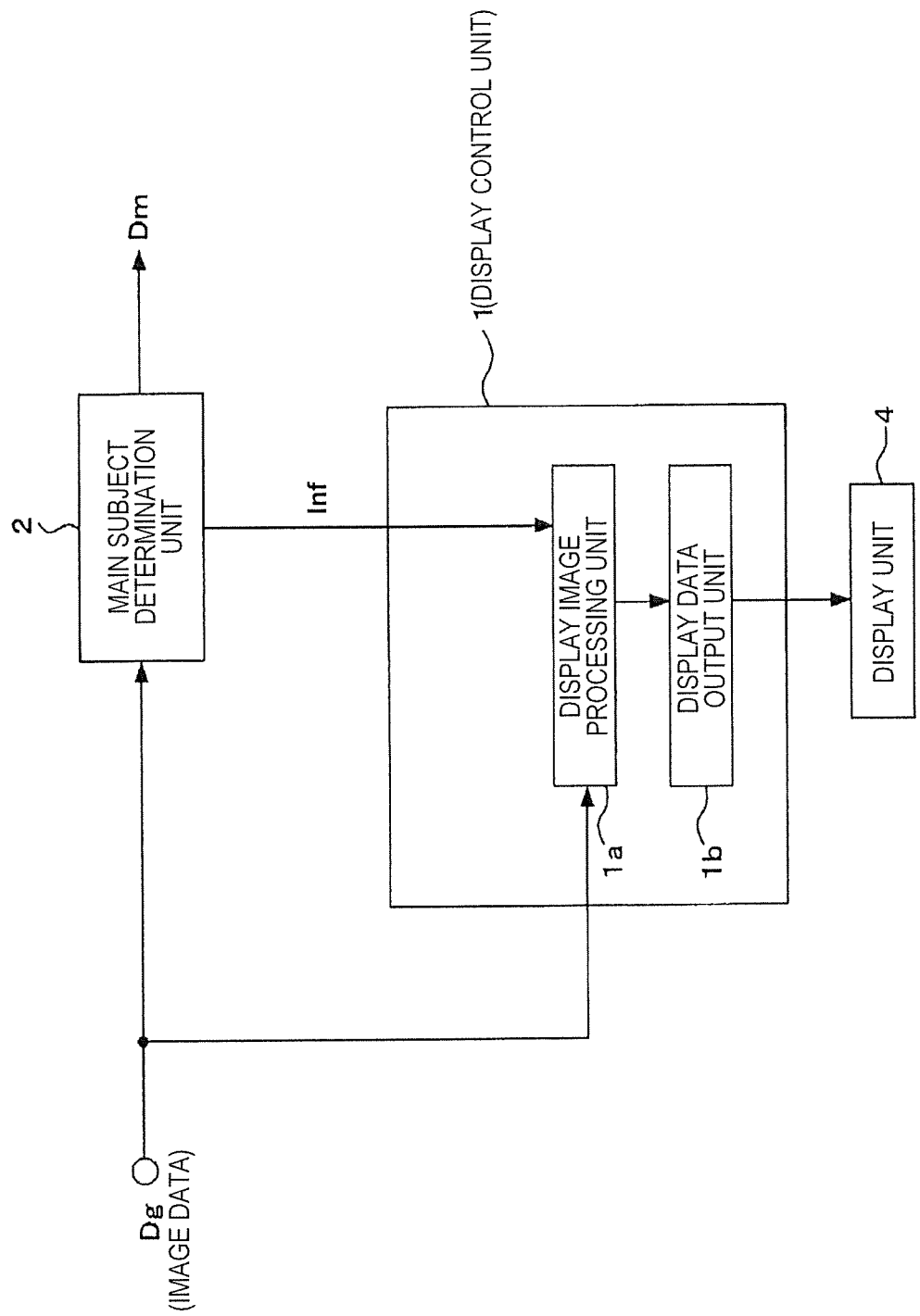
FIG. 1 is a block diagram of a configuration example of a display control device of an embodiment of the present disclosure.

FIG. 1 shows a configuration example of a display control device of an embodiment.

The display control unit 1 in FIG. 1 is an example of the display control device of the present disclosure. The display control unit 1 has a display image processing unit 1a and a display data output unit 1b.

Note that, although a main subject determination unit 2 and a display unit 4 are shown in FIG. 1, the units may be configured as constituent parts integrally provided with a "display control device," or as constituent parts of an external apparatus with respect to a "display control device."

First, the main subject determination unit 2 will be described.

The main subject determination unit 2 performs a process of detecting candidate images each serving as a candidate for a main subject and determining the main subject among the detected candidate images for a plurality of frames of input image data Dg.

For example, in the main subject determination unit 2, a candidate detection function and a main subject determination processing function are provided as arithmetic operation processing functions realized by software programs.

The main subject determination unit 2 first performs candidate detection using the candidate detection function.

The candidate detection is a process of detecting candidate images each serving as a candidate for the main subject for the plurality of frames of the input image data Dg.

In other words, for each of the frames of the image data Dg continuously (or frames intermittently) input on a time axis, images serving as candidates for the main subject are extracted by performing face image detection, human body image detection, and the like.

Note that, although face detection, human body detection, and the like are possible using techniques such as pattern matching for image analysis with respect to captured image data, another detector can also be realized in principle merely by replacing a dictionary used for the pattern matching. For example, candidate images for a main subject may be extracted for dog face detection, cat face detection (for specific breeds), or the like.

In addition, in a technique of motion body detection using a frame difference, for example, detecting a dynamic body and setting the dynamic body as a candidate image may be considered, and a technique of area-of-interest extraction that is called saliency (Saliency) may be used.

In addition, the main subject determination unit 2 treats information indicating extracted candidate images, for example, position information in a two-dimensional direction within screens of the candidate images (x and y coordinate values), a subject distance, an image size (the number of pixels), and the like as candidate image information for the process of candidate detection.

The main subject determination unit 2 then performs main subject setting based on, for example, computation of a degree of stable presence using the main subject determination processing function.

A "degree of stable presence" is a value that serves as an index of automatic main subject determination. In other words, it is set to be a value indicating a frequency with which a certain subject within the field of view (which will be described later) is in a predetermined positional state. For example, it is an index value with which it can be determined whether or not a subject is in a predetermined state in an image with a high frequency in terms of time. Specifically, it is a value indicating a cumulative time, duration, average presence, or the like for which a candidate image is present in a predetermined positional state as a positional state within the field of view, and an image with, for example, a long cumulative time or duration calculated with the "degree of stable presence" is designed to be an image which can be estimated as a subject at which a photographer mainly aims.

Note that the "field of view" described above means a space appearing in a captured image. It is used to refer mainly to a two-dimensional space of a screen plane in a captured image or a three-dimensional space that also includes a relative distance of a subject with respect to the position of a camera at the time of imaging.

The main subject determination unit 2 obtains a degree of stable presence within image data spanning over a plurality of frames for candidate images indicated by candidate image information obtained through the above-described candidate detection, and determines a main subject among the candidate images using the obtained degree of stable presence.

For this reason, the main subject determination unit 2 first determines positional states within the field of view for the candidate images indicated by the candidate image information.

A "positional state" is set to be a term collectively referring to states of absolute or relative positions of candidate images in the image data within the field of view.

Specific examples of the "positional state" are as follows:
the relative distance between a certain determination reference point within the field of view;
the relative positional relationship and relative distance with respect to a certain determination reference area within the field of view;
a position of a candidate image within a two-dimensional plane of a captured image;
a subject distance (a relative distance of a subject to a camera position at the time of imaging);
the relative positional relationship between a subject distance and the determination reference point or the determination reference area; and the like.

Next, the degree of stable presence of each candidate image within image data spanning a plurality of frames is obtained from a positional state of the candidate image in each determined frame.

Then, using the degree of stable presence obtained through the degree of stable presence computation function, a process of determining the main subject from each of the candidate images setting a certain candidate image as the main subject is performed.

In this manner, information indicating the image set as the main subject by the main subject determination unit 2 is output as main subject information Dm so as to be transferred to other application software, a processing circuit unit, and the like.

The main subject determination is performed as above as an example, but the display control unit 1 of the present disclosure is a unit that can appropriately present the course and result of the main subject determination process to a user. Note that techniques of main subject of determination other than that described above can also be considered.

The display image processing unit 1a of the display control unit 1 acquires information of the course and result of the main subject determination process (main subject determination process information Inf) from the main subject determination unit 2. In the main subject determination process information Inf, at least candidate image information with regard to candidate images set as candidates for a main subject in the main subject determination process and main subject information with regard to the determination result of the main subject determination are set to be included.

Then, the display image processing unit 1a performs a display data generation process in order to present the image data Dg that is set as a target of the main subject determination process (for example, captured image data) to the user on the display unit 4. Each frame of the image data Dg is basically set as a frame of display data, but in that case, in order to present the candidate images and the main subject as the determination result to the user in the course of main subject decision, the process is performed on the image data Dg so that candidate presentation and main subject presentation are performed on displayed images.

Particularly, the display image processing unit 1a performs a display image data process for the input image data Dg so that the candidate presentation based on the candidate image information and required subject presentation based on the main subject information which are in the acquired main subject determination process information Inf have different display forms.

The display data output unit 1b outputs the image data processed by the display image processing unit 1a as display data to be supplied to the display unit 4.

Accordingly, the image data Dg is displayed on the display unit 4, the candidate presentation and main subject presentation are performed on the display, and accordingly, the user can ascertain which subject is set as a candidate image and which image is automatically set as a main subject.

Note that the display control unit 1 (display control device) above can be realized by a CPU (Central Processing Unit) as an arithmetic operation processing device or a DSP (Digital Signal Processor).

In addition, the arithmetic operation processing device may be set to have the processing function as the main subject determination unit 2.

In addition, when the main subject determination unit 2 is set as an external device for the display control unit 1, the display control unit 1 may acquire the above-described main subject determination process information Inf from the main subject determination unit 2 thereby performing the same display control.

Figure 2:
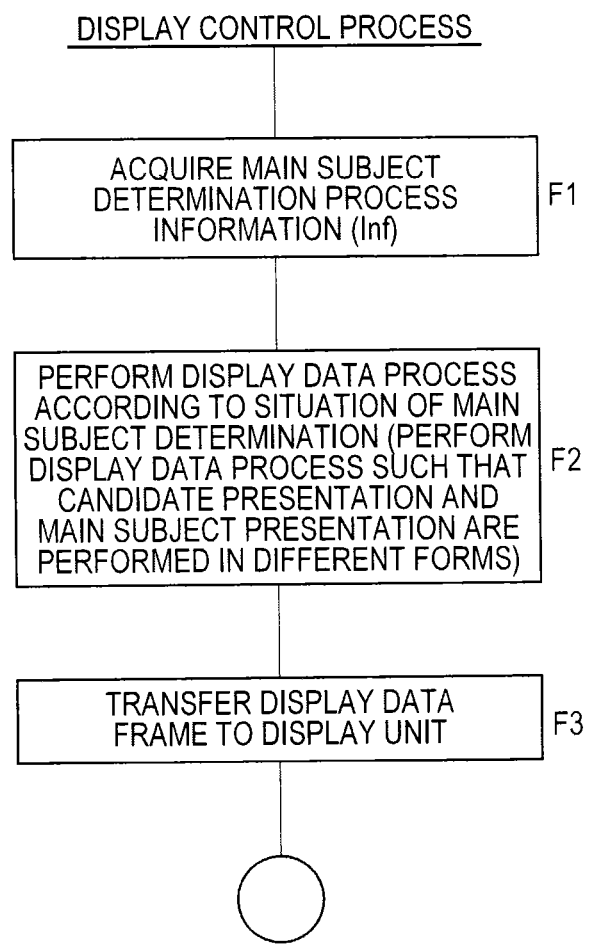
FIG. 2 is a flowchart of a process of the display control device of an embodiment.

The flow of the process performed by the display control unit 1 is as shown in FIG. 2. FIG. 2 is set to a process executed, for example, corresponding to each frame of input image data Dg (which may be each intermittent frame).

As Step F1, the display image processing unit 1a acquires the main subject determination process information Inf from the main subject determination unit 2.

If the main subject has yet to be decided in the main subject determination process, the candidate image information indicating positions (pixel areas, the positions of the center of gravity, or the like) of one or more candidate images within a screen is acquired.

If the main subject has already been decided in the main subject determination process, the main subject information indicating the position of the image set as the main subject (a pixel area, the position of the center of gravity, or the like) is acquired.

The display image processing unit 1a acquires the main subject determination process information Inf acquired at each frame time point.

In Step F2, the display image processing unit 1a performs the display image data process for the image data Dg that is the target of the main subject determination process such that candidate presentation based on the candidate image information and required subject presentation based on the main subject information are provided in different display forms.

In this case, for example, the display image processing unit 1a performs the display image data process such that the candidate presentation is performed to present the candidate images in a first form within an image for the period within the main subject determination, which begins when the main subject determination process is started and ends when the main subject is decided. In addition, when the main subject is determined, the display image data process is performed such that the main subject presentation is performed to present the main subject in a second form within an image.

In addition, when the main subject is determined, the display image processing unit 1a may perform the display image data process such that the candidate presentation is performed on candidate images which are not determined as a main subject in a form other than the second form, in addition to the main subject presentation in the second form.

As the candidate presentation and main subject presentation, a process is performed to add display of a frame, a pointer, or the like indicating a corresponding portion of a candidate image or a main subject to an image, or to perform different image processes on an area corresponding to a main subject or a candidate image and on another area.

As Step F3, the display data output unit 1b outputs the image data obtained in the display image data process by the display image processing unit 1a at each frame time point as display data to be supplied to the display unit 4.

The display unit 4 performs display of the input display data at each frame time point. Accordingly, the image data Dg is displayed, the candidate images are additionally presented during the execution of the main subject determination process, and the main subject is also presented to the user as the result of the main subject determination process. Particularly, as the candidate images and the main subject are displayed in different forms, the user can be clearly notified of the candidate images and the main subject.

2. Configuration of an Imaging Apparatus

Hereinafter, main subject determination and a display operation will be described in detail exemplifying an imaging apparatus 10 in which the display control unit 1 (display control device) described above is mounted.

Figure 3:
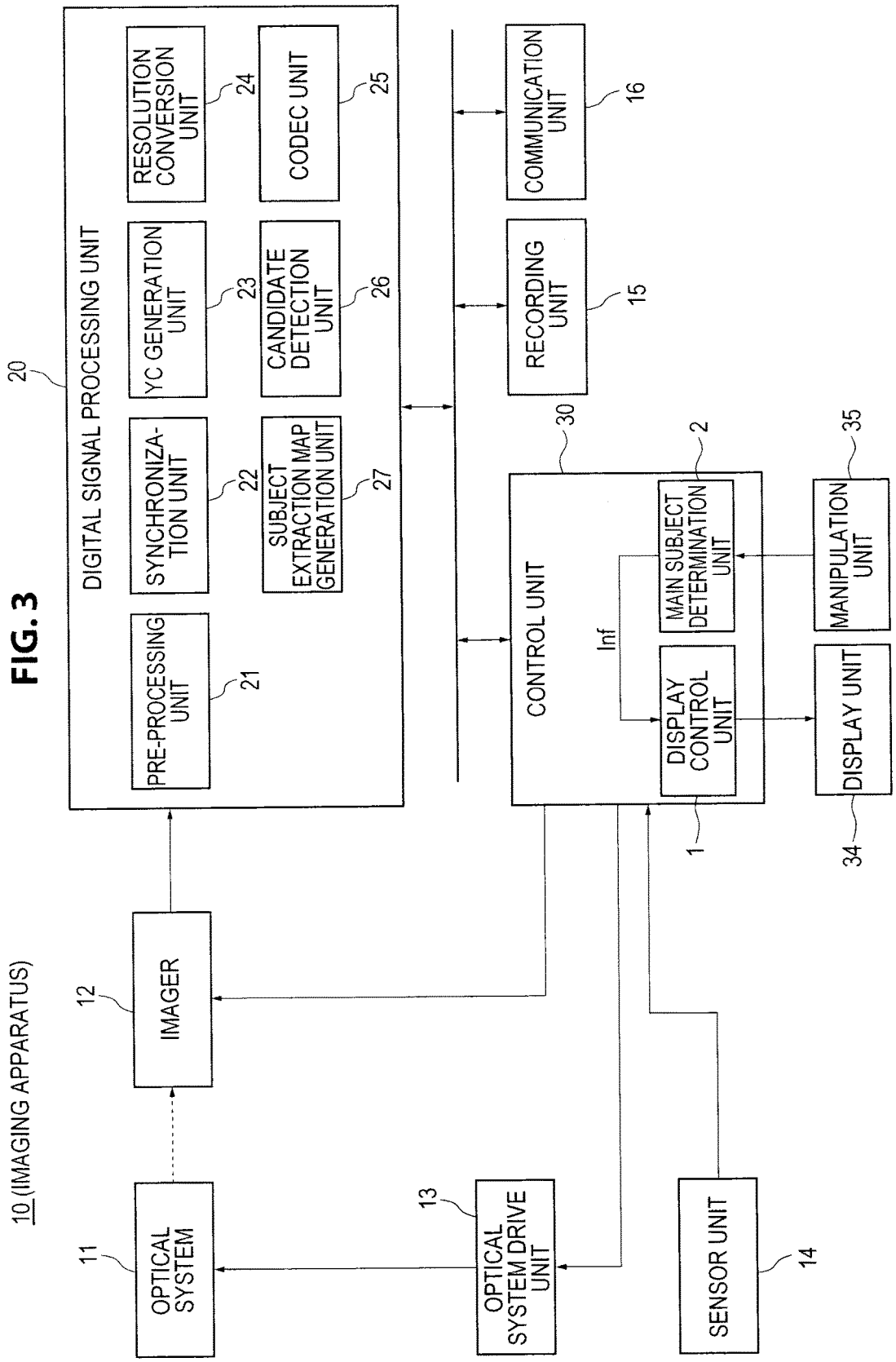
FIG. 3 is a block diagram of an imaging apparatus of an embodiment.

A configuration example of the imaging apparatus 10 of an embodiment is shown in FIG. 3. This imaging apparatus 10 is assumed to be a so-called digital still camera or digital video camera, which is equipment that images and records still images and dynamic images.

As the display control unit 1 of a control unit 30 in FIG. 3, the configuration equivalent to the display control device referred to in the claims is included as software. This display control unit 1 has the functions as the display image processing unit 1a and the display data output unit 1b as described in FIG. 1.

The control unit 30 performs an operation as the image processing method referred to in the claim by executing processes based on the program referred to in the claim.

The imaging apparatus 10 has an optical system 11, an imager 12, an optical system drive unit 13, a sensor unit 14, a recording unit 15, a communication unit 16 a digital signal processing unit 20, the control unit 30, a display unit 34, and a manipulation unit 35 as shown in FIG. 3.

The optical system 11 includes lenses such as a cover lens, a zoom lens, and a focus lens and a diaphragm mechanism. The optical system 11 collects light from a subject on the imager 12.

The imager 12 has an image sensor of, for example, a CCD (Charge Coupled Device) type, a CMOS (Complementary Metal Oxide Semiconductor) type.

In this imager 12, for example, a CDS (Correlated Double Sampling) process, an AGC (Automatic Gain Control) process, and the like are executed and further an A-D (Analog-Digital) conversion process is performed on electric signals obtained in photoelectric conversion in the image sensor. Then, an imaging sensor as digital data is output to the digital signal processing unit 20 in the later stage.

The optical system drive unit 13 drives the focus lens of the optical system 11 and executes a focus operation under the control of the control unit 30. Furthermore, the optical system drive unit 13 drives the diaphragm mechanism of the optical system 11 and executes exposure adjustment under the control of the control unit 30. Moreover, the optical system drive unit 13 drives the zoom lens of the optical system 11 and executes a zoom operation under the control of the control unit 30.

The digital signal processing unit 20 is configured as an image processor, for example, a DSP and the like. The digital signal processing unit 20 performs various types of signal processes for a digital signal (captured image signal) from the imager 12.

The digital signal processing unit 20 includes, for example, a pre-processing unit 21, a synchronization unit 22, a YC generation unit 23, a resolution conversion unit 24, a codec unit 25, a candidate detection unit 26, and a subject extraction map generation unit 27.

The pre-processing unit 21 performs a clamping process of clamping a black level of R, G, and B to a predetermined level, or a correction process among color channels of R, G, and B with respect to the captured image signal from the imager 12.

The synchronization unit 22 performs a demosaicing process such that image data for each pixel has all color components of R, G, and B.

The YC generation unit 23 generates (separates) a luminance (Y) signal and a color (C) signal from the image data of R, G, and B.

The resolution conversion unit 24 executes a resolution conversion process on the image data on which various types of signal processes have been performed.

The codec unit 25 performs a coding process for, for example, recording or communication with respect to the image data for which the resolution conversion has been performed.

The candidate detection unit 26 corresponds to the candidate detection function of the main subject determination unit 2 described in FIG. 1. The candidate detection unit 26 is set to have the functional configuration executed by the digital signal processing unit 70 in the example of FIG. 3, but this is an example, and it is needless to say that the process of the candidate detection unit 26 may be executed by the main subject determination unit 2 of the control unit 30.

The candidate detection unit 26 performs an image analysis process targeting, for example, a captured image signal (luminance signal or color signal) obtained in the YC generation unit 23 in units of frames and then extracts candidate images. As an example, a face image, for example, is detected, and an area in which the face image is present is extracted as a candidate image frame. With regard to the extracted candidate image, position information of the candidate image frame (x and y coordinate values on a screen, information of a subject distance, and the like) or size information (for example, the width, height, and number of pixels of the candidate image frame, and the like) are transferred to the main subject determination unit 2 of the control unit 30 as candidate image information. Note that, here, since the candidate image information is information indicating a frame of an image area serving as a candidate image, the term of candidate image information is also referred to as "candidate image frame information."

In addition, as the candidate image frame information, attribute information of candidate images (types of a face, a human body, a dog, a cat, and the like, individual (entity) identification information, and further image data itself may also be included.

It is considered that the candidate detection unit 26 may extract a specific image that is a target of a candidate using the pattern matching technique as described above, or detect a dynamic body using, for example, a dynamic body detection technique based on a frame difference and then set the dynamic body as a candidate image. Techniques of extracting and choosing a candidate image are not limited to the above, and various ones are considered.

In addition, the candidate detection unit 26 may perform a smoothing process, an outlier (outlier) removal process, or the like for the image to generate candidate image frame information.

The subject extraction map generation unit 27 is a functional configuration provided when a processing example serving as area presentation using a subject map to be described later is employed particularly with respect to display control. To be specific, as will be described in FIGS. 22 and 23, the subject extraction map generation unit 27 performs the image analysis process targeting, for example, a captured image signal (luminance signal or color signal) obtained by the YC generation unit 23 in units of frames, thereby generating a subject map indicating areas of subjects. This subject map is transferred to the control unit 30 for, for example, a display control process or a process after main subject determination.

Note that the subject extraction map generation unit 27 is set to have the functional configuration executed by the digital signal processing unit 20 in the example of FIG. 3, but it is not limited thereto, and an example in which the control unit 30 executes the subject extraction map generation process can also be considered.

The control unit 30 is configured by a micro-computer (arithmetic operation processing device) that has a CPU, a ROM (Read Only Memory), a RAM (Random Access Memory), a flash memory, and the like.

By executing a program stored in the ROM, the flash memory, and the like, the CPU comprehensively controls the entire imaging apparatus 10.

The RAM serving as a work area when the CPU performs various kinds of data processes is used for temporarily storing data, programs, and the like.

The ROM and the flash memory (non-volatile memory) are used for storing an OS (Operating System) necessary for the CPU to control each unit, content files such as image files, application programs for various operations, firmware, and the like. For example, programs for executing the main subject determination process and display control process that will be described later in the present example, and further application programs that use main subject determination results, and the like are stored therein.

The control unit 30 described above controls operations of necessary units relating to instruction of various signal processes in the digital signal processing unit 20, imaging operations and recording operations according to user manipulation, a reproducing operation of recorded image files, camera operations such as zooming, focusing, and exposure adjustment, user interface operations, and the like.

In addition, in the case of the present embodiment, the control unit 30 includes the function of the main subject determination unit 2, and executes the main subject determination process to be described later.

In this case, the main subject determination unit 2 executes a position state determination process, a stable presence degree computation process and a main subject setting process based on a degree of stable presence for candidate image information transferred from the candidate detection unit 26.

Furthermore, in the case of the present embodiment, the control unit 30 includes the function of the display control unit 1, and executes the display control process to be described later.

In this case, the display control unit 1 generates display data so that the candidate images and the main subject are respectively presented in different display forms based on the main subject determination process information Inf from the main subject determination unit 2, and then outputs the data to the display unit 34. In other words, the display control unit 1 basically performs the processes described in FIGS. 1 and 2.

The display control unit 1 generates the display data to be displayed on the display unit 34, and specifically, causes still images and dynamic images captured and then recorded on a recording medium to be reproduced and displayed, or generates display data such that through images (subject monitoring images) are displayed on the display unit 34 as dynamic images based on captured image data of each frame captured during standby of releasing (shutter manipulation). At the time of the image display, display data to which display content of main subject presentation or candidate presentation is added is generated.

In addition, the display control unit 1 executes display of various manipulation menus, icons, messages, and the like, i.e., GUIs (Graphical User Interfaces) on the screen.

In the imaging apparatus 30, parts in which display output and audio output with respect to the user are executed and user manipulation inputs are received are provided as user interface parts. For this reason, the imaging apparatus has a display device, a manipulation device, a speaker device, a microphone device, and the like. In FIG. 3, the display unit 34 and the manipulation unit 35 are shown.

The display unit 34 is a display unit performing various kinds of display for the user (photographer, and the like), and is formed to have a display device, for example, an LCD (Liquid Crystal Display) or an organic EL (Electro-Luminescence) display formed on the housing of the imaging apparatus 10. Note that it may be formed using an LCD, an organic EL display, or the like in the form of a so-called view finder.

This display unit 34 is constituted by the above-described display device and a display driver that causes the display device to execute display.

The display driver drives the display device based on the display data supplied from the control unit 30 (display control unit 1).

Accordingly, display according to the content of the display data such as display data, i.e., reproduced images, or through images transmitted from the display control unit 1 of the control unit 30, or menu display is executed in the display device, and then presented to the user.

Particularly, in the case of the present embodiment, for example, display that enables the user to recognize the candidate images and the main subject of the determination result from the main subject determination process on the through images and reproduced images (candidate presentation and main subject presentation) is also executed.

The manipulation unit 35 has an input function of inputting user manipulation, and transfers a signal corresponding to input manipulation to the control unit 30.

The manipulation unit 35, for example, is realized by various manipulators provided on the housing of the imaging apparatus 10, a touch panel formed on the display unit 34, and the like.

As the manipulator on the housing, a reproduction menu start button, a decision button, an arrow key, a cancellation button, a zoom key, a slide key, a shutter button (a release button) and the like are provided.

Furthermore, by touch panel manipulation using the icons and menus displayed on the touch panel and the display unit 34, various kinds of manipulation may be possible.

The recording unit 15 includes, for example, a non-volatile memory, and serves as a storage area for storing image files (content files) such as still image data or dynamic image data, attribute information of the image files, thumbnail images and the like.

The image files are stored in the form of, for example, a JPEG (Joint Photographic Experts Group), a TIFF (Tagged Image File Format), a GIF (Graphics Interchange Format) and the like.

The actual form of the recording unit 15 can be variously considered. For example, the recording unit 15 may be a flash memory that is embedded in the imaging apparatus 10, or may have a form based on a memory card (for example, a portable flash memory) attachable to and detachable from the imaging apparatus 10 and a card recording and reproduction unit that performs recording and reproduction access to the memory card. Furthermore, the recording unit may be realized in the form of an HDD (Hard Disk Drive) and the like that is embedded in the imaging apparatus 10.

Furthermore, in the present example, a program for performing a stable imaging state presumption process and the main subject determination process that will be described later may be stored in the recording unit 15.

The communication unit 16 performs data communication or network communication with an external device in a wired or wireless manner.

For example, the communication unit performs communication of the captured image data (still image files or dynamic image files) with an external display apparatus, a recording apparatus, a reproduction apparatus and the like.

Furthermore, as a network communication unit, the communication unit may perform communication through various networks, for example, the Internet, a home network, or a LAN (Local Area Network), or perform various types of data transmission and reception with a server, a terminal and the like on the network.

The sensor unit 14 comprehensively shows various kinds of sensors. For example, a gyro sensor for detecting camera shaking, an acceleration sensor for detecting an attitude of the imaging apparatus 10, and the like are provided. Furthermore, an angular velocity sensor for detecting an attitude and movement of the imaging apparatus 10, a luminance sensor for detecting outer luminance for exposure adjustment or the like, as well as a distance measuring sensor for measuring a subject distance may be provided.

In addition, as the sensor unit 14, there are also cases in which a zoom lens position sensor for detecting a position of the zoom lens in the optical system 11 and a focus lens position sensor for detecting the focus lens are provided.

Information detected by each of the various kinds of sensors of the sensor unit 14 is transmitted to the control unit 30. The control unit 30 can perform various kinds of control using the information detected by the sensor unit 14.

3. Main Subject Determination Process

First the main subject determination process executed by the control unit 30 (main subject determination unit 2) in the imaging apparatus 10 having the above configuration will be described.

The display control process executed along with the main subject determination process will be described later.

The main subject determination process is a process in which a degree of stable presence within image data spanning a plurality of frames is obtained for each of candidate images indicated by candidate image information, and using the degree of stable presence, a main subject is determined among the candidate images.

An outlined processing example of the main subject determination process will be described in FIG. 4, and a specific processing example thereof will be described later in FIGS. 5 to 8.

Figure 4:
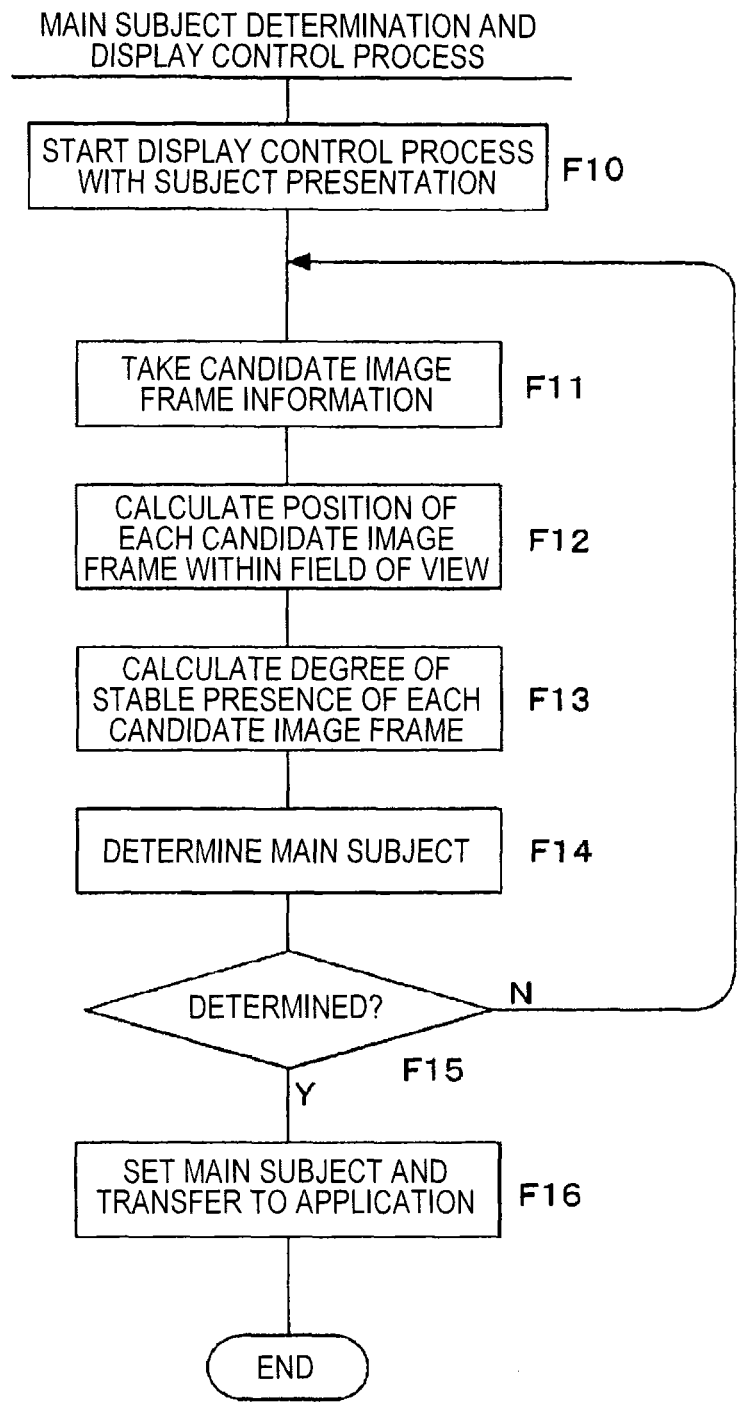
FIG. 4 is a flowchart of a detailed main subject determination and display control process of an embodiment.

FIG. 4 shows a main subject determination and display control process.

In FIG. 4, Step F10 is a process performed by the display control unit 1 of the control unit 30, and Steps F11 to F16 are processes performed by the main subject determination unit 2 of the control unit 30.

When the main subject determination process is started, the display control process for presenting the candidate images and main subject is also started therewith in Step F10. The display control process started in Step F10 will be described in detail in FIG. 9 and thereafter.

Regarding the main subject determination process, in Step F11, the control unit 30 takes candidate image frame information of any one frame from the candidate detection unit 26.

In Step F12, the control unit 30 determines a positional state with regard to one or each of a plurality of candidate image frames indicated by the taken candidate image frame information by calculating a position within a field of view.

In this case, as a positional state, a distance of a candidate image to a determination reference point set within the field of view is determined. Alternatively, as a positional state, the positional relationship of the candidate image with a determination reference area set within the field of view is determined.

In Step F13, the control unit 30 calculates a degree of stable presence with regard to each candidate image frame. In this case, the control unit 30 computes cumulative time information indicating that the positional state satisfies a predetermined condition as the degree of stable presence. Alternatively, the control unit 30 computes duration information indicating that the positional state continuously satisfies the predetermined condition as the degree of stable presence.

Note that, in the computation of the degree of stable presence, position information of the candidate image within the field of view or size information of the candidate image may be used as a condition for the computation.

In Step F14, the control unit 30 determines a main subject using the degree of stable presence.

Here, the determination of Step F14 may be a process of determining, as a main subject, a candidate image of which the degree of stable presence has reached a predetermined value most quickly from the start of main subject determination. Alternatively, it may be a process of determining a candidate image having the highest value of the degree of stable presence in a period of main subject determination as a main subject.

In addition, in the determination of the main subject, position information of the candidate image within the field of view or size information of the candidate image may also be used in addition to the value of the degree of stable presence.

At the time when a candidate image of which the value of the degree of stable presence has reached the predetermined value is not yet present, or when a predetermined period of main subject determination has not yet passed and a candidate image having the highest value of the degree of stable presence during the period has not been chosen, a main subject is not determined in the process of Step F14. In this case, the control unit 30 returns to Step F11 from F15, and repeats each process. In other words, the same processes are performed by taking the candidate image frame information of frames to be processed next from the candidate detection unit 26.

When a candidate image of which the value of the degree of stable presence has reached the predetermined value at a certain point of time is found, or when the predetermined period of main subject determination has passed and a candidate image having the highest value of the degree of stable presence during the period has been chosen, the control unit 30 proceeds to Step F16 from F15. Then, the candidate image determined in Step F14 is set to be a main subject. Then, the main subject information is transferred to an application program, or the like.

The application program or the like performs a process according to specification of an image set as a main subject. The process is, for example, focus control, a tracking process, an image effect process, or the like.

Note that the main subject determination process of FIG. 4 above is a processing form in which determination is executed while the candidate image information is taken during the period in which main subject determination is performed.

On top of that, taking (buffering) of the candidate image information is performed during a certain period. In addition, a processing form in which main subject determination is performed using the taken candidate image information after the period elapses is also considered.

Next, a specific processing example corresponding to the main subject determination process of FIG. 4 above will be described.

In the specific example below, as a positional state of a candidate image frame, a distance thereof to a set determination reference point is obtained.

In addition, as a degree of stable presence of each candidate image frame, cumulative time information that satisfies the condition that the positional state (distance to the determination reference point) be within a predetermined threshold value is computed.

In addition, a candidate image of which the degree of stable presence has reached a predetermined value most quickly from the start of main subject determination is set to be determined as a main subject.

Figure 5:
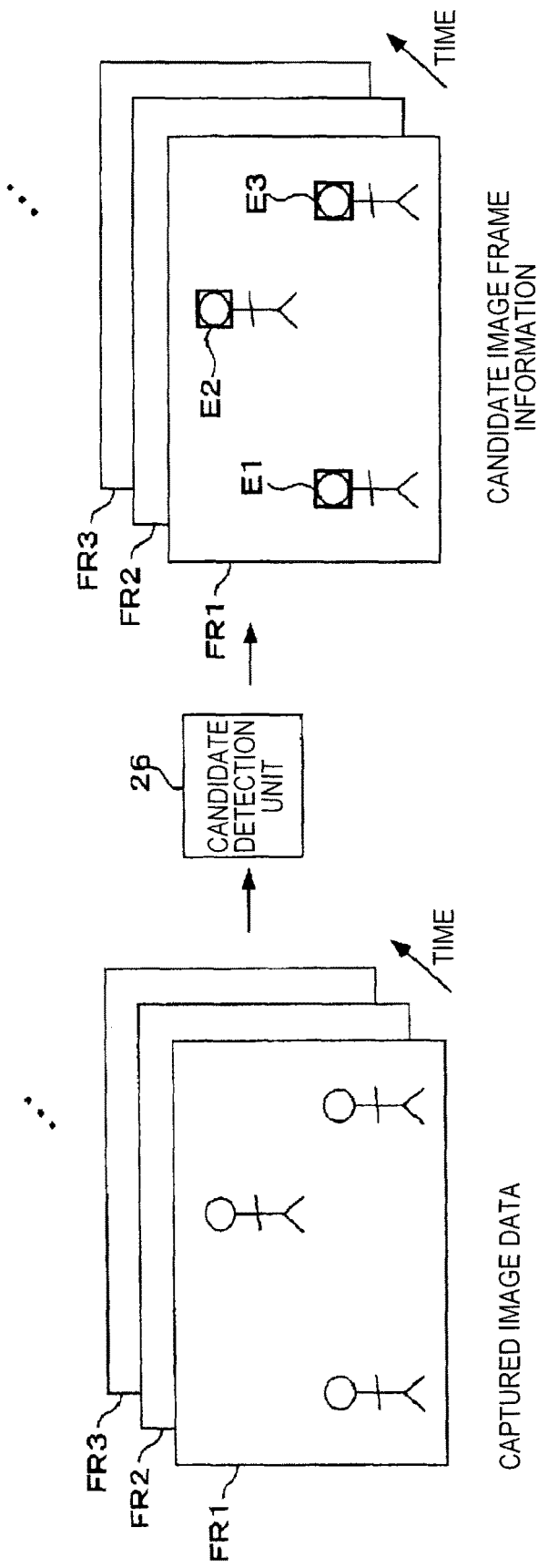
FIG. 5 is an illustrative diagram of candidate image frames and determination reference points of an embodiment.
Figure 7:
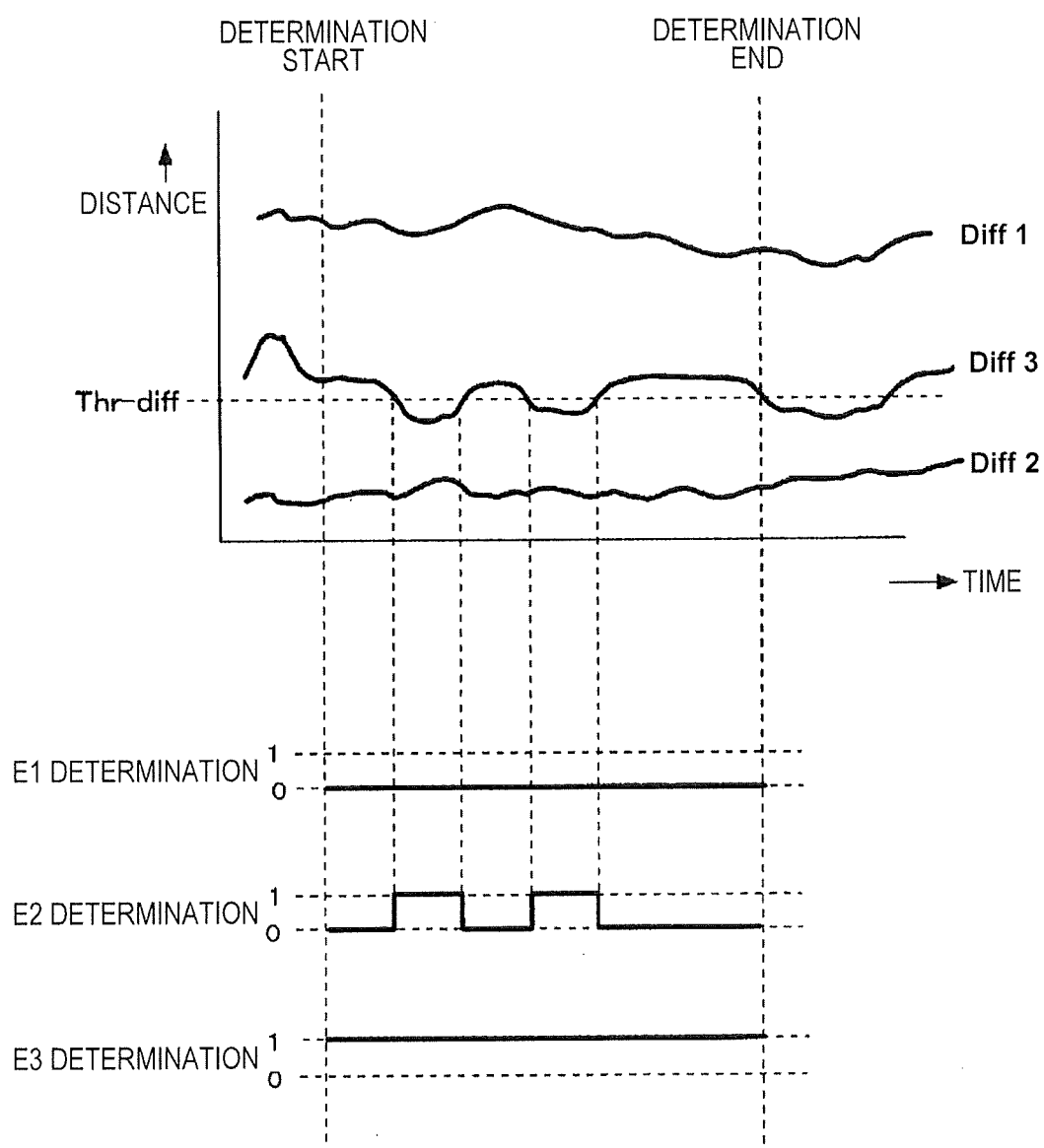
FIG. 7 is an illustrative diagram of determination of a degree of stable presence according to position states of an embodiment.

Therefore, each of candidate image frames, the distance thereof to the determination reference point, and the degree of presence will be first described in FIGS. 5, 6, and 7.

FIG. 5 schematically shows a candidate image frame extraction operation performed in the candidate detection unit 26.

The drawing shows each of frames FR1, FR2, FR3, . . . of a captured image signal input to the digital signal processing unit 20 through an operation of the optical system 11 and the imager 12 of the imaging apparatus 10. The candidate detection unit 26 performs detection of candidate images for each of the continuous frames sequentially input as above (or for each of intermittent frames).

For example, when there are three persons in the frame FR1 as shown in the drawing, each of the face image portions of the persons is extracted as a candidate image, and then candidate image frame information of candidate image frames E1, E2, and E3 are output. For example, the candidate image frame information of the candidate image frame E1 includes, for example, position information (x and y position information and subject distance information), within the image of the candidate image frame E1, and size information (the width, height and the number of pixels of the frame) and attribute information of the frame, and the like.

The candidate detection unit 26 also generates such candidate image frame information with regard to the candidate image frames E2 and E3, and then transfers the information to the control unit 30 (main subject determination unit 2).

In the same manner, the candidate detection unit 26 extracts candidate images of the following frames FR2, FR3, . . . , generates candidate image frame information for each of candidate image frames of the images, and then transfers the information to the control unit 30 (main subject determination unit 2).

The control unit 30 computes a distance to the determination reference point as a positional state of each of the candidate image frames each time the control unit takes the candidate image frame information of each frame.

FIG. 6A shows an example of the determination reference point SP. This is an example in which the center of an image is set to be the determination reference point SP. x and y coordinate values of the determination reference point SP are set to (Cx, Cy).

When the candidate image frame information of each of the candidate image frames E1, E2, and E3 is taken at the time of the frame FR1, for example, the control unit 30 computes the distances Diff1, Diff2, and Diff3 from each of the centers of gravity G of the candidate image frames E1, E2, and E3 shown in the drawing to the determination reference point SP.

Note that setting the determination reference point SP at the center of a screen is an example.

The determination reference point SP may be set at a position, for example, on a slightly upper-left side of the center as shown in FIG. 6B. This is because there are many cases to be considered in which a main subject is better to be disposed at a position that is not the center when, for example, composition of a still image is considered.

In any event, the distances between each of candidate image frames (for example, E4 or E5) and the determination reference point SP (for example, Diff4 and Diff5) are computed as shown in FIG. 6B.

The determination reference point SP may be set at, for example, such fixed positions as shown in FIGS. 6A and 6B, or may be arbitrarily designated by a user through a touch operation on a display screen or the like. In addition, several candidate points for the determination reference point may be presented on the screen of the display unit 34 to a user so that the user can select one. Furthermore, the control unit 30 is considered to determine an optimum position in consideration of composition and the like according to the content of an image, an image analysis result, and the like for automatic setting.

In other words, the following conditions are considered with regard to the determination reference point SP;
- being set at a pre-decided fixed position such as the position of the center of an image, a position deviated from the center, or the like;
- being arbitrarily designated by a user;
- being set such that several candidate points are presented to a user so that the user can select one;
- being flexibly set in an automatic manner by the control unit 30 determining an optimum position according to the content of an image; and the like.

The distance Diff(n) as a positional state of a candidate image frame E(n) is obtained at a time point of each frame.

FIG. 7 shows the state of changes of the computed distances Diff1, Diff2, and Diff3 on the assumption that the candidate image frames E1, E2, and E3 are continuously present in frames (FR1, FR2, . . . ) for a certain period of time.

For example, a case in which a photographer is capturing three subjects for a given period of time using the imaging apparatus 10 is assumed. Because each of the three persons moves independently, the photographer moves a subject distance of the imaging apparatus 10, camera shaking or the like occurs, and each of the computed distances Diff1, Diff2, and Diff3 changes on a time axis.

In a processing example in FIG. 8 that will be described later, a degree of stable presence is set to be a cumulative time during which a subject is close to the determination reference point SP. For this reason, a distance threshold value Thr-diff is used in determining whether a subject is "close or not close."

In the lower part of FIG. 7, determination results of whether or not a distance is within the distance threshold value Thr-diff at each time point of the distance Diff1, Diff2, and Diff3 are shown. If a distance Diff(n) is equal to or shorter than the distance threshold value Thr-diff, being close="1" is set.

The result obtained by cumulatively adding the determination result "1" at each time point is the degree of stable presence of Processing Example 1.

A period from determination start to determination end varies depending on specific processing examples. In the processing example in FIG. 8 that will be described later, the cumulative addition value of the determination result "1" that is equal to or less than the distance threshold value Thr-diff serves as a cumulative time indicating the level of stable presence up until the time point, and a time point at which a candidate image of which the cumulative time has reached a predetermined value is found is the time point of determination end.

In the example of FIG. 7, the candidate image frame E3, for example, is determined to continuously have "1 (=close to the determination referent point SP)," and at the time point at which the cumulative addition value reaches a certain predetermined value, determination ends, and the candidate image frame E3 is determined to be a main subject.

Note that it is assumed that continuity does not matter here. The distance Diff2 of the candidate image frame E2 in FIG. 7, for example, is determined to have "1" and "0" depending on time points, but they invariably relate a cumulative time, and thus when the situation of "1" is frequency and the cumulative time of the frame reaches a predetermined value earlier than other candidate image frames, the candidate image frame E2 can also be determined as a main subject. However, an example in which continuity is used for the condition for the degree of stable presence is of course considered.

A specific example of the main subject determination process (Step F11 to F15 of FIG. 4) of the control unit 30 will be described in FIG. 8. Steps F101 to F114 indicate Steps F11 to F15 of FIG. 4 corresponding thereto.

When the main subject determination process is started, the control unit 30 first sets a variable TSF=0 and a count value Cnt(n)=0 in Step F100 as an initial setting.

The variable TSF is a flag indicating whether or not a main subject has been set. TSF="0" indicates the state in which a main subject has not been determined.

In addition, the count value Cnt(n) is a value of a counter that adds values of comparison determination results of the distances Diff and the distance threshold value Thr-diff described above.

Note that "n" indicates natural numbers of 1, 2, 3 . . . and the count value Cnt (n) is set to be a count value corresponding to each detected candidate image frame E (n) like the candidate image frames E1, E2, and E3. When the three candidate image frames E1, E2, and E3 are detected, Cnt1, Cnt2, and Cnt3 are used as count values. For the sake of description of the flowchart, it is advised that a process with regard to the count value Cnt(n) be understood as, for example, a process targeting each of Cnt1, Cnt2, and Cnt3.

In addition, in the same manner, the distance Diff(n) collectively indicates the distances Diff1, Diff2, and Diff3 from the determination reference point SP to each of the three candidate image frames E1, E2, and E3, and a process with regard to the distance Diff(n) is used to mean, for example, a process with regard to each of the distances Diff1, Diff2, and Diff3.

In addition, a candidate image frame E(n) indicates each of the candidate image frames E1, E2, E3 . . . , but it is preferably distinguished for each subject over a plurality of frames. In an example in which the candidate detection unit 26 extracts a face, when a person A, a person B, and a person C are subjects, for example, the face image portion of the person A is set to be the candidate image frame E1, the face image portion of the person B to be the candidate image frame E2, and the face image portion of the person C to be the candidate image frame E3 common in each of the frames. If only a person D is interposed as a subject in a certain middle frame, the face image portion of the person D is set to be a candidate image frame E4. Thus, it is better for the candidate detection unit 26 to not only merely detect a "face" but also determine an entity (individual).

In Step F101, the control unit 30 takes candidate image frame information of a certain frame from the candidate detection unit 26. For example, with regard to each candidate image frame E(n), information including an x value and a y value of two-dimensional (x-y) coordinate values of image data as position information, and a width w and a height h of the candidate image frame as size information are acquired.

Note that the candidate image frame information may also include a subject distance (a relative distance of a subject to a camera position indicated by a value of a z axis direction orthogonal to the two-dimensional (x-y) coordinate plane; z value), the number of pixels, and the like.

In Step F102, the control unit 30 computes the coordinates of the center of gravity G with regard to each candidate image frame E(n). For example, for the candidate image frame information, the coordinate values of an upper-left vertex of a square-shaped candidate image frame are given as x and y coordinate values of the candidate image frame. The x and y coordinate values are set to (E(n)_x, E(n)_y). In addition, as shown in FIG. 6, the x and y coordinates have the upper-left portion of the screen plane as the origin O (where the x and y coordinate values are (0, 0)).

In addition, the width w of the candidate image frame E(n) is set to E(n)_w and the height h thereof is set to E(n)_h.

Then, if the coordinate values of the center of gravity G of the candidate image frame E(n) are set to (E(n)_cx, E(n)_cy), the coordinate values of the center of gravity G are obtained as follows.

$$E(n)\_cx = E(n)\_cx + E(n)\_w/2$$

$$E(n)\_cy = E(n)\_cy + E(n)\_h/2$$

In Step F103, the control unit 30 computes the distance Diff(n) from the center of gravity G of each candidate image frame E(n) to the determination reference point SP. With coordinate values (Cx, Cy) of the determination reference point SP, the distance is obtained as follows.

$$\text{Diff}(n) = \sqrt{\{(E(n)\_cx - Cx)^2 + (E(n)\_cy - Cy)^2\}}$$

In Step F104, the control unit 30 checks the variable TSF. If the variable TSF=0, the process proceeds to Step F105.

Note that, when the main subject determination process is started and then continues at all times, the process of Step F104 is excluded at the time when no determination is necessary (when the variable TSF=1). Step F104 may be set to be unnecessary when the main subject determination process of FIG. 8 is set to be executed through user manipulation or automatic activation determination when necessary, or the like.

In Steps F105, F106, and F107, the control unit 30 checks whether or not each candidate image frame E(n) satisfies predetermined conditions with regard to the distance Diff(n).

In other words, whether or not the distance Diff(n) to the determination reference point SP is close to the determination reference point SP is determined using the distance threshold value Thr-diff.

To this end, the control unit 30 compares the distance Diff(n) from each candidate image frame E(n) to the determination reference point SP to the distance threshold value Thr-diff in Step F105, and if Diff(n)<Thr-diff is satisfied, a flag Flg(n)=1 (close) is set in Step F106. In addition, if Diff(n)<Thr-diff is not satisfied, the flag Flg(n)=0 (not close) is set in Step F107.

Next, in Steps F108 and F109, the control unit 30 computes the degree of stable presence of each candidate image frame E(n). In this case, in Step F108, whether or not the flag Flg(n)=1 is satisfied is checked for each candidate image frame E(n), and if the flag Flg(n)=1 is satisfied, the count value Cnt(n) increases (1 is added) in Step F109. When the flag Flg(n)=0, the count value Cnt(n) does not change.

The count value Cnt(n) serves as the value of the degree of stable presence as the cumulative addition value described above. In other words, it is the value indicating the frequency of the candidate image frame E(n) in the state of being "close" to the determination reference point SP.

Next, in Steps F111, F112, and F113, the control unit 30 determines a main subject using the degree of stable presence of each candidate image frame E(n).

The control unit 30 checks in Step F111 whether or not the count value Cnt(n) of each candidate image frame E(n) has reached a count threshold value CTthr.

If Cnt(n)≥CTthr is not satisfied, in other words, if any count value Cnt(n) of each candidate image frame E(n) has not reached the count threshold value CTthr, the variable TSF=0 is set without change in Step F113, and then the process returns to Step F101 without setting to determination end in Step F114. In this case, the processes of Step F101 and the succeeding steps are executed based on candidate image frame information input for the next frame in the same manner as described above.

Note that, if the variable TSF=0 is satisfied, determination of a main subject has not yet been completed and the determination process continues in Step F114, and if the variable TSF=1 is satisfied, main subject determination is assumed to be completed.

When the variable TSF=1 is detected in Step F104 described above, determination end is set without change.

Although detailed description will be omitted, selection of a main subject may be designed to be performed in parallel with automatic main subject determination of the present example through, for example, touch manipulation for the main subject performed by a user on the screen of the display unit 34, manipulation of half-pressing a shutter button after adjusting a subject in a predetermined position on the screen, or the like. When a user performs such designation manipulation during execution of the process of FIG. 8, it is preferable to prioritize the user manipulation. Thus, when main subject setting is performed through such a manual manipulation, the variable TSF=1 is set. In this case, the process of FIG. 8 may be set to stop (stop halfway) based on the determination of Step F104 and F114.

Since the main subject determination based on the degree of stable presence is made for over a certain time length, if the process with regard to the candidate image frame information is not performed for a certain period of time (a number of frames), the process returns to Step F101 and succeeding processes are repeated without the determination ending in Step F114 described above.

Here, for example, a certain candidate image frame E3 shown in FIG. 7 may be discontinuous, but a situation in which the frame is present in a position close to the determination reference point SP in a plurality of frames on a captured image with a high frequency is assumed. Thus, many opportunities in which the count value Cnt3 of the candidate image frame E3 increases in Step F109 are created as time goes by, and a count value Cnt3 is obtained more quickly than count values Cnt1 and Cnt2.

Then, the count value Cnt3 reaches the count threshold value CTthr for the first at a certain time point.

In such a case, the control unit 30 causes the process to proceed from Step F111 to F112.

In Step F112, the control unit 30 determines the candidate image frame E(n) of which the count value Cnt(n) has reached the count threshold value CTthr to be a main subject, and performs main subject setting. Then, variable TSF=1 is set.

In this case, the determination end is set in Step F114. In other words, the main subject determination process of FIG. 8 is completed with, for example, the candidate image frame E3 set to be a main subject.

Note that this Processing Example continues until variable TSF=1 is set, but in a real case, it is proper to set a predetermined time limit. In other words, when it is difficult to determine a main subject even after a predetermined time elapses from the process start time of FIG. 8, it is regarded that no main subject is present, and then the process is set to end.

The main subject determination process is performed as described above.

In this main subject determination process, the degree of stable presence in a plurality of frames among the extracted candidate images is obtained. In other words, an index value for determining whether a subject is present in an image being stably positioned with a high temporal frequency is obtained.

For example, a subject having a high reliability that is regarded as being aimed at as a target by a photographer who is holding a camera has a high degree of stable presence. In other words, a subject that a photographer primarily aims at is set to be included in, as a position within a captured image, a point or an area that the photographer regards as a center, and as the photographer further aims at the subject, the subject is naturally included in the captured image for a long period of time. Thus, a subject that is stably positioned and present in a captured image with a high temporal frequency (a subject having a high degree of stable presence) can be estimated as a main subject that a photographer is aiming at.

Determination of a main subject is performed with such a degree of stable presence. Accordingly, a main subject is automatically determined without a particular operation designated by a user such as a photographer, and thus user operability of the various electronic devices that perform operations according to a setting of the main subject is further enhanced.

According to the processing example in FIG. 8, as a user holds the imaging apparatus 10 (tracks a subject) so that the subject that the user wants to primarily capture is as close to the determination reference point SP such as the center of an image, or the like as possible, the subject is automatically determined as a main subject.

Accordingly, a main subject is automatically determined without particular manipulation designated by a user such as a photographer, and thus user operability of the imaging apparatus 10 that performs operations according to a setting of the main subject is further enhanced.

Particularly, in the processing example in FIG. 8, the degree of stable presence is determined based on a cumulative time of the state of being "close" to the determination reference point SP. In the case of a subject moving around or a subject making quick movements such as an animal, there are cases in which a photographer has difficulty in continuously capturing a subject of interest at the center of an image for a certain period of time (for example, even for about several seconds). In addition, there are also cases in which it is quite difficult to keep a desired subject at the center of an image due to serious camera shaking or the like depending on a photographer's skills. Even in such cases, main subject determination can be made relatively quickly using a cumulative time.

Therefore, the cumulative time is useful for a target subject that moves quickly or for a relatively inexperienced user.

In addition, since the main subject determination process does not have to be performed for a fixed period of time and the process ends at the time when a main subject is determined, it is advantageous in that a main subject determination is quickly established depending on subjects and photographer's skills.

Note that other various specific processing examples are considered as the main subject determination process.

As a degree of stable presence of each candidate image frame, for example, duration information that a positional state (distance to the determination reference point) continuously satisfies the condition for being within a predetermined threshold value may set to be computed.

In a case where, it is evaluated whether or not a frame is stably present based on duration, when a subject that moves little is targeted, the target subject can be continuously captured at the center of an image or the like with ease, and thus there is a high possibility of being able to accurately set a main subject desired by the user. In addition, depending on photographers' skills, a subject desired to be primarily captured can be continuously kept at the center of an image or the like (a position close to the determination reference point SP), and thus there is a high possibility of being able to accurately determine a subject desired by a photographer as a main subject. In other words, it is possible to further raise a possibility of being able to determine a subject desired by a user as a main subject depending on a photographer having an advanced level of photographing skill or subjects.

In addition, weighting may be given in the computation of the degree of stable presence. It is given such that, for example, a value close to the determination reference point SP is weighted to time points after the execution period of the main subject determination process or the like.

When a photographer holds a camera normally while aiming at a subject, the photographer has difficulty capturing the subject of interest at a desired position such as the center of an image at first, and gradually adjusts the orientation of the camera. Taking this situation into consideration, the subject that the photographer has in mind as a "main subject" at first is gradually captured at the center of the image as time elapses.

Thus, during the execution of the main subject determination process, weighting a value close to the determination reference point SP as time elapses heightens the possibility of being able to determine a main subject that matches the photographer's intentions.

In addition, with regard to the computation of the degree of stable presence, adding a condition in addition to the condition of whether or not the distance Diff(n) is equal to or shorter than the distance threshold value Thr–diff is also considered. For example, a condition that a subject distance be in a predetermined range, a size be in a predetermined range, an image be a specific image type or the like may be added.

In addition, a processing example in which a certain main subject determination period is set, and a candidate image having a highest degree of stable presence for the period is determined as a main subject is also considered.

In addition, in the above-described processing example, the positional relationship with the set determination reference point is set as a positional state of each candidate image frame, but the positional relationship with a determination reference area may be set.

For example, an area in a square shape, a circular shape, or the like such as the center of an image is set, and the area is set as a determination reference area. The positional relationship of each candidate image frame E(n) with the determination reference area is defined based on, for example:

whether or not the center of gravity of the frame is included in the determination reference area;

whether or not the entire frame is included in the determination reference area;

whether or not at least a part of the frame is included in the determination reference area;

whether or not the distance to an outer edge of the determination reference area is within a predetermined value; and the like.

Under the conditions of the positional relationship, a degree of stable presence can also be obtained.

In addition, as a degree of stable presence of each candidate image frame, the average value of positional states (for example, a distance to the determination reference point) may be set to be computed. An average distance serves as an index indicating a positional state of a frame being close to the determination reference point with a high temporal frequency. For example, "a low value of the average distance" has the same meaning as "a long cumulative time" mentioned in the above-described processing example. In addition, a candidate image frame that satisfies the condition that the average distance be the shortest and within a predetermined threshold value can also be determined as a main subject.

In the present embodiment, main subject determination is performed as in, for example, the above example, and an objective of performing main subject determination in the imaging apparatus 10 and the like will be described.

First, a use example of a main subject determination result will be explained.

Main subject determination is executed while, for example, a user (photographer) aims at a shutter timing (release timing), and the control unit 30 can perform the following processes after the unit automatically determines a main subject.

Tracking Process

A main subject set in each captured frame is tracked. For example, a main subject is specified on a through image display for the user, and provided for adjusting an angle of view performed by the user (for example, for decision of a subject in a state in which a camera is held in a hand).

Note that, as presentation of a main subject, highlight display of the frame of the main subject on the through image display by the display unit 34 is considered. In addition, the highlight display or the like may be performed for a given period immediately after the determination, or may be performed as long as the main subject is present within the through image.

Focusing

Auto focus is controlled for a main subject. In addition, in accordance with the tracking process, focus is adjusted tracking the main subject even when the main subject moves around.

Exposure Adjustment

Automatic exposure adjustment is performed based on brightness (luminance) of a main subject.

Directivity Adjustment

When sound collection is performed using a microphone together with capturing (for example, dynamic image capturing), directivity adjustment is performed according to a direction of a main subject within a field of view.

Zoom Control

Auto zoom is controlled with respect to a main subject. For example, the zoom lens is automatically driven so that the main subject is projected in a captured image in a predetermined size or greater at all times. Together with the tracking process, an angle of view may set to be adjusted using zoom according to a change in a distance to the main subject.

Recording Start Control

Main subject determination may be set to trigger a start of dynamic image capturing. For example, dynamic image capturing and recording are started according to decision of a main subject.

In addition, a main subject can also be used in various signal processes performed with respect to a captured image signal.

Image Effect Process

Image processes including image quality adjustment, noise reduction, skin color adjustment, and the like are performed only on the area of a main subject in each captured frame.

Alternatively, adding an image effect, for example, a mosaicing process, an airbrushing process, a paint-out process, or the like in an area other than the area of the main subject is also considered.

Image Editing Process

An editing process such as framing, cropping, or the like is performed on a captured image or a recorded image.

For example, a process of cropping, enlarging, or the like of a partial area within a frame in which a main subject is included can be performed.

In addition, cutting of image peripheral portions of captured image data or the like can be performed so that a main subject is disposed at the center of the image, and composition adjustment can be performed.

These are merely examples, and various processes of application programs or automatic adjustment functions included in the imaging apparatus to use a set main subject are considered in addition to them.

Next, at what point of time the main subject determination process should be executed is also variously considered.

For example, whenever the imaging apparatus 10 is turned on to perform imaging (a period in which the display unit 34 displays a through image), the main subject determination process may be performed.

In addition, when a main subject is determined and then the tracking process is performed, the main subject determination process may be performed again at the time when the tracking is lost.

In addition, the main subject determination process may be set to start through user manipulation.

In addition, the process may be executed whenever a user selects a determination execution mode, or tracking is lost.

In addition, automatically activating the main subject determination process regardless of user manipulation may also be considered.

The following effects are achieved by performing the main subject determination process.

It is naturally difficult to perform manipulation of designating a main subject when a photographer aims at the subject holding the imaging apparatus 10. In addition, the action of designating subjects many times is bothersome. If main subject determination is set to be automatically performed, such troubles are overcome, and the effect of reduced stress on the user is obtained.

In addition, the imaging apparatus 10 that is carried and used by a user, such as a digital still camera, a camera included in a mobile telephone, or the like used by general users, has the display unit 34 of a small size, and thus it is difficult for the user to perform accurate manipulation of designating a main subject on a screen. The problem of erroneous designation is resolved by performing automatic determination as described in the present embodiment.

In addition, if the imaging apparatus 10 is set to automatically perform main subject determination, the main subject determination is performed by a user merely holding the imaging apparatus 10 and aiming at a subject, and thus effects of enhancement of a feeling of intelligence that the user senses from the apparatus and enhancement of added value are obtained.

In addition, since the user can use the imaging apparatus 10 with a feeling of being able to image a main figure only by naturally holding the apparatus, imaging opportunities and use cases associated therewith can increase, and accordingly, a user-friendly camera can be provided to the user.

Based on the above points, as a camera of hand-held type, the imaging apparatus 10 of the present embodiment that automatically performs main subject determination is particularly preferred.

4. Display Control Process

4-1: Display Control Example of Each Time Point

The display control process performed with the main subject determination process above will be described.

The control unit 30 (display control unit 1) performs display control after the start of the main subject determination process such that candidate presentation on a captured image displayed on the display unit 34 (display for causing a user to recognize candidate images) and main subject presentation (display for causing a user to recognize a main subject) are executed based on main subject determination process information Inf.

The time in which the imaging apparatus 10 performs the main subject determination process is, for example, when a user holds the imaging apparatus 10 to capture a still image, then decides a subject, and waits for an opportunity to take a picture, or the like. During this period, a so-called through image (a dynamic image as a monitoring image of a scene of a subject being captured by the imager 12) is displayed on the display unit 34 in the imaging apparatus 10.

Thus, the candidate presentation and main subject presentation are displayed such that a candidate image or a main subject image is shown on the through image, or such an image itself is made to be noticed.

The present embodiment particularly enables the candidate presentation and main subject presentation to be performed in different display forms, and users to clearly distinguish and recognize a candidate image and a main subject through the presentations.

First, display operations with respect to a candidate image and main subject will be variously exemplified in FIG. 9.

Main Subject Determination Session

Hereinbelow, the period from a start of the main subject determination process to decision of a main subject will be referred to as a "main subject determination session." In the main subject determination session, the control unit 30 (display control unit 1) can perform display control using information of candidate images (for example, the above-described candidate image frames) as display control based on the main subject determination process information Inf.

As display control operations in the main subject determination session, three examples (X1, X2, and X3) shown in FIG. 9 are considered.

X1: Candidate presentation is not performed. In other words, only general through image display is performed.

X2: Candidate presentation is performed. In other words, display is performed to cause a user to recognize portions set as candidate images on a through image.

X3: Candidate presentation is performed according to generation of a candidate image (X3-1). Then, when a candidate image that is likely to be selected as a main subject is generated according to the progress of the main subject determination process, display of the candidate image is performed in a different form (potential candidate presentation) from another candidate image (X3-2) so that it can be recognized as a candidate image with greater potential (having a high possibility of being selected as a main subject) than other candidate images.

Main Subject Decision Time

In the main subject determination process, when a main subject is decided, the period in the range of, for example, a predetermined time thTM from the time point at which the main subject is decided is referred to as a "main subject decision time."

In the main subject decision time, the control unit 30 (display control unit 1) can perform display control using information of the main subject and information of candidate images as display control based on the main subject determination process information Inf.

As display control operations in the main subject decision time, it is required to clearly present a main subject decided by a user. Therefore, two examples 9 (Y1 and Y2) shown in FIG. 9 are considered.

Y1: Only main subject presentation is performed on a through image. Candidate presentation, i.e., presentation of candidate images that are not selected as a main subject (hereinafter, non-selected candidates) when there are a plurality of candidate images, is not performed.

Y2: Main subject presentation and non-selected candidate presentation are performed on a through image. In other words, a main subject is shown to a user and candidate images that are not selected as a main subject are also shown.

Post Main Subject Decision Session

The period after, for example, the above-described predetermined time thTM elapses from the above-described main subject decision time is referred to as a "post main subject decision session." This period is assumed to be a period in which main subject information is transferred to an application and the like and any process that uses the main subject information is performed.

In this post main subject decision session, the control unit 30 (display control unit 1) can perform display control using information of the main subject that is previously decided and information of non-selected candidate images as display control based on the main subject determination process information.

As display control operations in the post main subject decision session, three examples (Z1, Z2, and Z3) shown in FIG. 9 are considered.

Z1: Main subject presentation is not performed. In other words, only general through image display is performed.

Z2: Only main subject presentation is performed on a through image. Non-selected candidate presentation is not performed.

Z3: Main subject presentation and non-selected candidate presentation are performed on a through image.

When it comes to the time axis transition of "main subject determination session"→"main subject decision time-"→"post main subject decision session" described above, broadly 18 display operation examples are considered as combinations of the forms of display in each period.

In the transition, when the transition of display of "main subject determination session"→"main subject decision time" is focused, the display operation examples of ex1 to ex5 shown below are useful.

(ex1) X2→Y1→Z (any of Z1, Z2, and Z3)
(ex2) X2→Y2→Z (any of Z1, Z2, and Z3)
(ex3) X1→Y2→Z (any of Z1, Z2, and Z3)
(ex4) X3→Y1→Z (any of Z1, Z2, and Z3)
(ex5) X3→Y2→Z (any of Z1, Z2, and Z3)

Each of the examples will be described in detail.

FIG. 10A is the display operation example of X2→Y2→Z1 as (ex1) described above.

For example, it is assumed that a dog that is a subject in the main subject determination session is set as a candidate image. In this case, candidate presentation KM is performed in a display form that is, for example, a dashed-lined square frame.

Then, it is assumed that the dog is decided as a main subject as it is. In the main subject decision time, main subject presentation MA is performed on the image portion of the dog in a display form that is, for example, a thick-lined square frame.

In the post main subject decision session, neither main subject presentation nor non-selected candidate presentation is performed.

FIG. 10B is also the display operation example of X2→Y1→Z2 as (ex1) described above.

In the main subject determination session, the candidate presentation KM is performed on a subject (dog) set as a candidate image in a display form that is, for example, a dashed-lined square frame.

Then, it is assumed that the dog is decided as a main subject as it is. In the main subject decision time, the main subject presentation MA is performed on the image portion of the dog in the display form that is, for example, the thick-lined square frame.

In the post main subject decision session, the main subject presentation MA is performed in the display form that is, for example, a dotted-lined square frame.

FIG. 11A is the display operation example of X2→Y2→Z3 as (ex2) described above.

In the main subject determination session, the candidate presentation KM is performed on subjects (a dog and a rabbit) set as candidate images respectively in the display form that is, for example, the dashed-lined square frame.

Then, it is assumed that the dog is decided as a main subject. In the main subject decision time, the main subject presentation MA is performed on the image portion of the dog in the display form that is, for example, the thick-lined square frame. In addition, non-selected candidate presentation KMs is performed on the image portion of the rabbit in the same display form that is the dashed-lined square frame as in the candidate presentation KM performed until then.

In the post main subject decision session, the main subject presentation MA is performed in the display form that is, for example, a solid-lined square frame, and the non-selected candidate presentation KMs is performed in the display form that is the dotted-lined square frame.

FIG. 11B is the display operation example of X1→Y2→Z3 as (ex3) described above.

In the main subject determination session, one or a plurality of subjects (a dog and a rabbit in this example) are set as a candidate image, but candidate presentation is not performed.

Then, it is assumed that the dog is decided as a main subject. In the main subject decision time, the main subject presentation MA is performed on the image portion of the dog in the display form that is, for example, the thick-lined square frame. In addition, the non-selected candidate presentation KMs is performed on the image portion of the rabbit in the display form that is the solid-lined square frame.

In the post main subject decision session, the main subject presentation MA is performed in the display form that is, for example, a thick dashed-lined square frame, and the non-selected candidate presentation KMs is performed in the display form that is the dotted-lined square frame.

Figure 12:
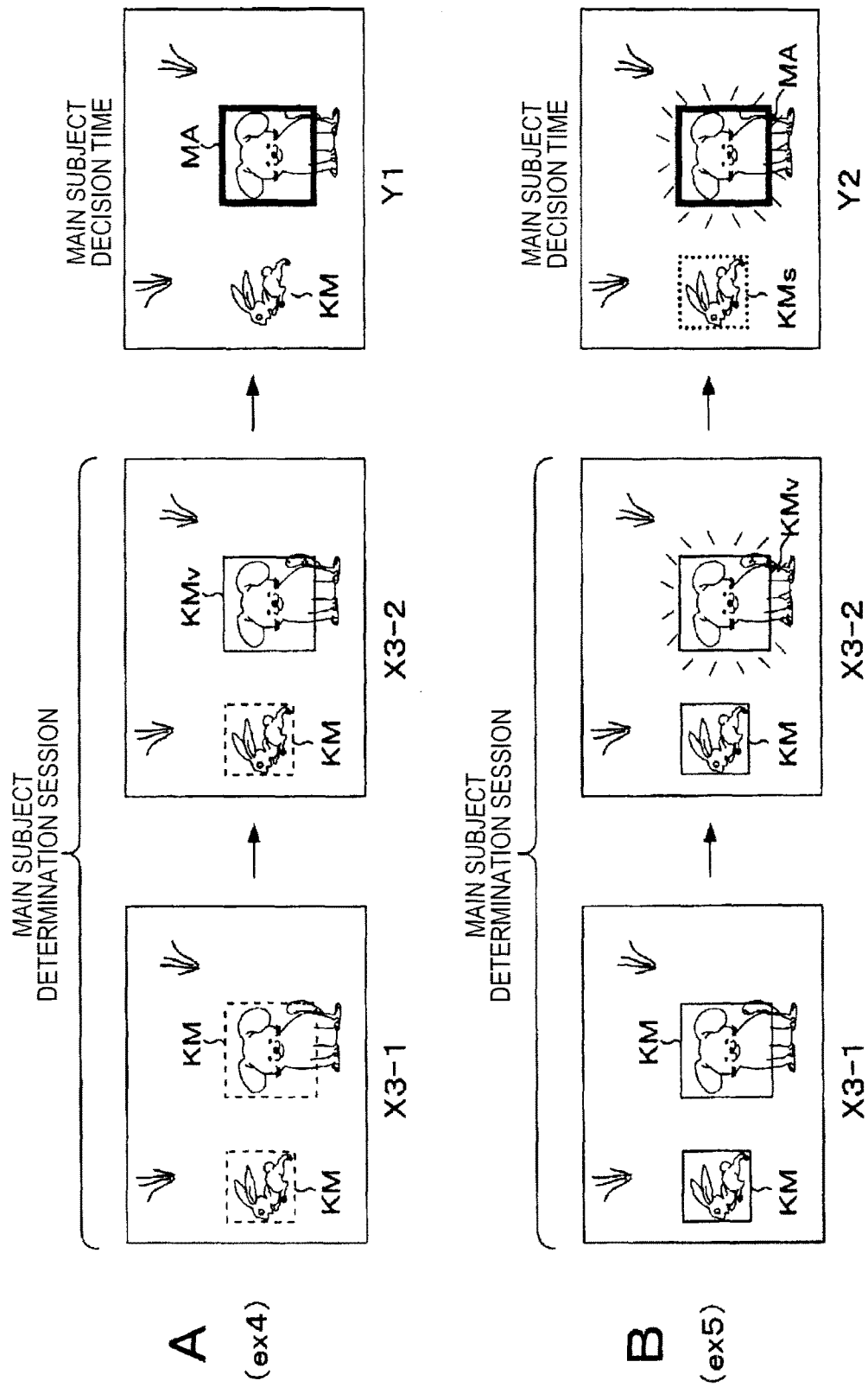
FIG. 12 is an illustrative diagram of transitions of display states of an embodiment.

FIG. 12A is the display operation example of X3→Y1→Z as (ex4) described above (Z (the post main subject decision session) is not illustrated).

As a first stage of the main subject determination session, the candidate presentation KM is performed on each of subjects (a dog and a rabbit) which are set as candidate images in the display form that is, for example, the dashed-lined square frame (X3-1).

Then, as a second stage of the main subject determination session, a certain subject (dog) set as a candidate image is determined to have a high possibility of being selected as a main subject. At this moment, potential candidate presentation KMv is performed on the image portion of the subject (dog) as a potential candidate in the display form that is, for example, the solid-lined square frame that is a different form from the other candidate image (rabbit) (X3-2).

Then, it is assumed that the dog is decided as a main subject. In the main subject decision time, the main subject presentation MA is performed on the image portion of the dog in the display form that is, for example, the thick-lined square frame. Non-selected candidate presentation is not performed.

Figure 10:
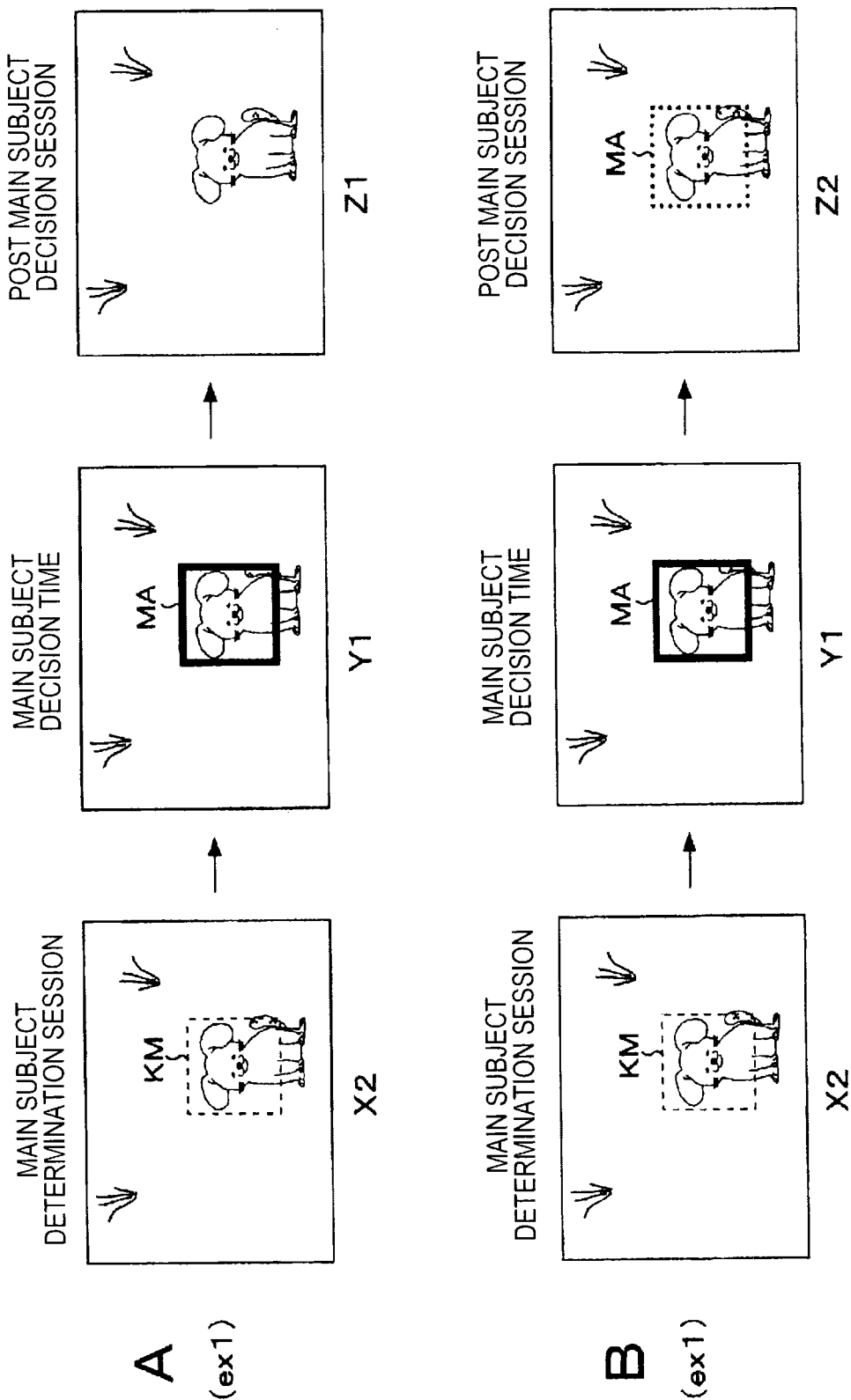
FIG. 10 is an illustrative diagram of transitions of display states of an embodiment.
Figure 11:
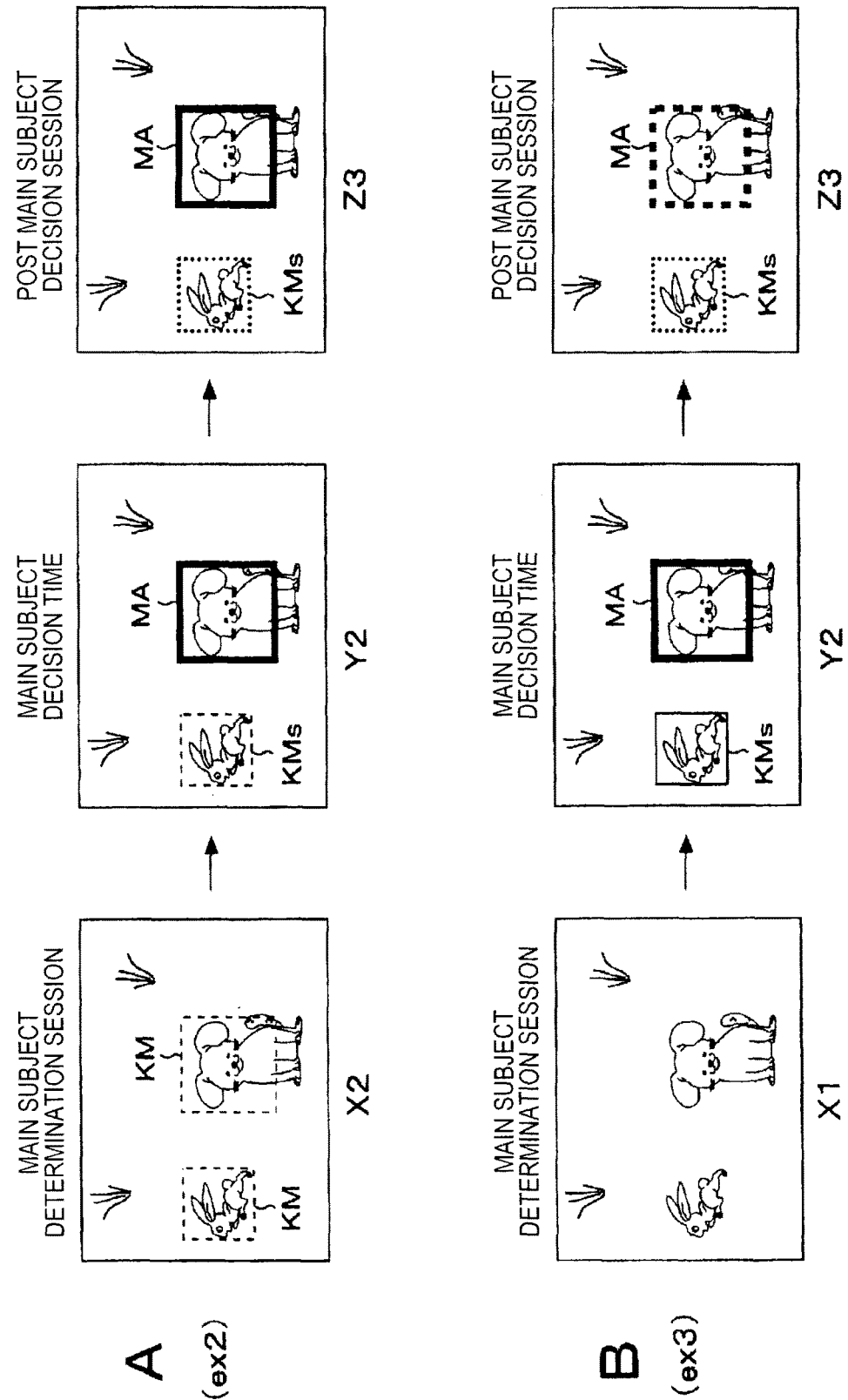
FIG. 11 is an illustrative diagram of transitions of display states of an embodiment.

In the post main subject decision session, any of Z1, Z2, and Z3 shown in FIGS. 10 and 11 is set.

FIG. 12B is the display operation example of X3→Y2→Z as (ex5) described above (Z (the post main subject decision session) is not illustrated).

As a first stage of the main subject determination session, the candidate presentation KM is performed on each of subjects (a dog and a rabbit) which are set as candidate images in the display form that is, for example, the solid-lined square frame (X3-1).

Then, as a second stage of the main subject determination session, a certain subject (dog) set as a candidate image is determined to have a high possibility of being selected as a main subject. At this moment, the potential candidate presentation KMv is performed on the image portion of the subject (dog) as a potential candidate in the display form that is, for example, a flickering solid-lined square frame that is a different form from the other candidate image (rabbit) (X3-2).

Then, it is assumed that the dog is decided as a main subject. In the main subject decision time, the main subject presentation MA is performed on the image portion of the dog in the display form that is, for example, a flickering thick-lined square frame. In addition, non-selected candidate presentation KMs is performed on the image portion of the rabbit in the display form that is the dotted-lined square frame different from the candidate presentation KM performed up until then.

In the post main subject decision session, any of Z1, Z2, and Z3 shown in FIGS. 10 and 11 is set.

In the present embodiment, particularly the candidate presentation KM (also including the non-selected candidate presentation KMs and potential candidate presentation KMv) and the main subject presentation MA are set to be performed in different display forms.

As display control processes performed by the control unit 30 (display control unit 1) for the presentation, the following examples (p1 and p2) are considered.

(p1) The display control unit 1 performs a display image data process on captured image data serving as a through image such that the candidate presentation KM is performed to present a candidate image within an image in a first form in the main subject determination session and the main subject presentation MA (a display form different from the first form) is performed to present a main subject in a second form within the image in the main subject decision time.

(ex1), (ex2), (ex4), and (ex5) described above in which X2 or X3 is employed in the main subject determination session correspond to display operations based on the above process. This is because, in the examples, the candidate presentation KM and main subject presentation MA are performed in different display forms at least in the main subject determination session and main subject decision time.

With the display control, a user can recognize candidate images according to the progress of time and then can clearly recognize a subject image in the main subject decision time.

(p2) The display control unit 1 performs a display image data process on captured image data serving as a through image such that the candidate presentation (non-selected candidate presentation KMs) is performed on a candidate image that is not determined as a main subject in a form other than the second form (the first form or still another form) in the main subject decision time, in addition to the main subject presentation MA in the second form.

(ex2), (ex3), and (ex5) described above in which Y2 is employed in the main subject decision time correspond to display operations based on the above process. This is because, in the examples, the non-selected candidate presentation KMs and main subject presentation MA are performed in different display forms at least in the main subject decision time.

With this display control, a user can clearly recognize a subject image and a non-selected candidate image respectively in the main subject decision time.

Next, with regard to the post main subject decision session, there are an example in which only the main subject presentation MA is performed (when Z2 is employed in any of (ex1) to (ex5)) and an example in which both the main subject presentation MA and non-selected candidate presentation KMs are performed (when Z3 is employed in any of (ex1) to (ex5)).

Particularly, when the display forms of the main subject presentation MA and non-selected candidate presentation KMs in the post main subject decision session are focused, the following examples (p3 and p4) are considered.

(p3) The display control unit 1 performs the display image data process on captured image data serving as a through image such that the main subject presentation MA is performed to present a main subject within an image in the main subject decision time, and then the form of the main subject presentation MA is changed to a different display form.

For example, this is applied to the examples shown in FIGS. 10B, 11A, and 11B.

With this control, the main subject can be continuously recognized, awareness of a user can be enhanced with a very outstanding display form in, for example, the main subject decision time, and then it is possible to make the screen less complicated in a display form of which a degree of highlighting on the screen is lowered to a certain level.

(p4) The display control unit 1 performs the display image data process on captured image data serving as a through image such that the non-selected candidate presentation KMs is performed on a candidate image that is not determined as a main subject in a form different in the main subject presentation MA in the post main subject determination session.

For example, this is applied to the examples shown in FIGS. 11A and 11B.

With this control, a user can continuously recognize a main subject with clarity, and can also continuously recognize a candidate image that is likely to be selected as a main subject. Thus, the examples are favorable when, for example, a main subject is desired to be changed.

In addition, as a display control process by the control unit 30 (display control unit 1) in the main subject determination session, the following example (p5) that corresponds to (ex4) and (ex5) described above is considered.

(p5) The display control unit 1 performs the display image data process on captured image data serving as a through image such that the candidate presentation KM is performed in the first form within an image and the potential candidate presentation KMv is further performed to present a candidate image that is determined to have a high possibility of being selected as a main subject among candidate images in a form different from the first form in the main subject determination session.

For example, this is applied to the examples shown in FIGS. 12A and 12B.

Through this, a user can ascertain a potential candidate image before a main subject is automatically decided. In addition, when a subject that a user does not intend is set as a potential candidate image, for example, it is also possible to take a measure of preventing the candidate image from being determined as a main subject by changing a subject direction or the like before a main subject is decided.

4-2: Display Forms of Main Subject Presentation and Candidate Presentation

In the present embodiment such as the above examples, a display form is changed in various cases as the display forms of the candidate presentation KM and the main subject presentation MA are set to be different.

Herein, examples of the display forms of the candidate presentation KM and the main subject presentation MA, and a transition of a display form in each case will be described.

First, FIG. 13 illustrates various display forms of cases in which the main subject presentation MA and the candidate presentation KM are executed through display showing a corresponding portion within a frame serving as one screen. For example, they are specific examples of the main subject presentation MA and the candidate presentation KM when the face portion of a person is set as a candidate image or a main subject.

FIG. 13A shows various display forms when a corresponding portion in an image is displayed to be surrounded by a square frame. As the square frame, various display forms such as a solid-lined frame, a dashed-lined frame, a thick-lined frame, a dotted-lined frame, and a double-lined frame as illustrated are considered.

FIG. 13B is an example in which the color of the frame line of the square frame is variously changed. For the square frame illustrated, various display forms having different colors such as a red frame, a blue frame, and a white frame are considered.

FIG. 13C is an example in which a corresponding portion in an image is shown by, for example, causing the square frame to flicker as illustrated is a display form in which the state of the square frame is dynamically changed. In addition to flickering, various dynamic display forms, for example, changing the color of the frame, changing the size or form of the frame, rotating a stereoscopic frame image, and the like are considered.

FIG. 13D is an example in which a corresponding portion of a subject is displayed using the frame as a filter or an image effect area such as a square frame entirely painted translucently, a high luminance frame (highlight display), or the like.

FIG. 13E shows a circular shape, a polygonal shape, and an indefinite shape as various frame shapes. In addition to these, an oval shape, a triangular shape, or a frame of which a part of the outer circumference is cut such as [ ] is possible. All examples of FIGS. 13A to 13D described above can also be applied to the case of various frame shapes of FIG. 13E.

The above is examples of display to show a corresponding portion in an image using a "frame," but such a corresponding portion in an image may be shown using an image of a pointer.

FIG. 13F is an example in which a subject is indicated by a star mark or an arrow mark. Various other marks can of course be considered.

Next, FIG. 14 shows examples in which the main subject presentation MA and the candidate presentation KM are executed by performing different image processes in an image corresponding to a main subject or a candidate image in an image and another image. These are specific examples of the main subject presentation MA and the candidate presentation KM when, for example, the body portion of a person is set as a candidate image or a main subject.

FIG. 14A is set as one certain frame of a captured image. As will be described later, the subject extraction map generation unit 27 shown in FIG. 3 can generate a subject map indicating a corresponding area as shown in FIG. 14B.

Using such a subject map, the main subject presentation MA and the candidate presentation KM can be executed by performing different image processes on the corresponding area and the remaining area.

In FIGS. 14C to 14F, examples in which areas are presented by performing different image processes on a corresponding area and the remaining area (area presentation I to IV) are shown.

FIG. 14C (area presentation I) is an example in which processing is performed on an area corresponding to a main subject (or a candidate subject) as an image process. The oblique lines indicate the state in which the processing of the image process has been performed.

For example, an example in which information of a subject map is combined such as alpha blending or the like is considered. In addition, examples in which the corresponding area is subjected to high luminance (highlight display), color conversion so as to have an outstanding color, or 3D display are also considered.

FIG. 14D (area presentation II) is an example in which processing of an image process is performed on the area other than the area corresponding to a main subject (or a candidate image). The oblique lines indicate the state in which the processing of the image process has been performed.

As the image process performed on backgrounds as above, for example, monochrome, monotone, low luminance, mosaicing, painting-out, image airbrushing, and the like are considered. In other words, a process that makes a corresponding area conspicuous is appropriate.

FIG. 14E (area presentation III) is an example in which a contour is drawn on the area corresponding to a main subject (or candidate image). This is a kind of the subject map combining process of FIG. 14B, which is achieved by extracting information of boundary pixels between a corresponding portion and the other portion in a differential process of each pixel value of the subject map, and then combining the information of the boundary pixels.

FIG. 14F (area presentation IV) is an example in which different image processes are performed on both the area corresponding to a main subject (or candidate image) and the remaining area. The oblique lines indicate a state in which processing of a certain image process has been performed, and dots indicate a state in which processing of another image process has been performed.

In this case, performing an image process that enables conspicuous display as described in FIG. 14C on a corresponding area, and performing another image process that enables inconspicuous display as described in FIG. 14D on the background area is considered.

As shown in FIGS. 13 and 14 above, quite various display forms are considered as the main subject presentation MA, candidate presentation KM, and further the non-selected candidate presentation KMs and potential candidate presentation KMv.

In the present example, at least the main subject presentation MA and candidate presentation KM are set to be performed in different display forms in terms of time or an image space.

In addition, with regard to the potential candidate presentation KMv, a "potential candidate" is presented by performing both the main subject presentation MA and candidate presentation KM in different display forms.

Note that the non-selected candidate presentation KMs is presentation of a candidate image that is not selected as a main subject as a result, and thus may be performed in the same display form as or different display form from the candidate presentation KM.

Figure 15:
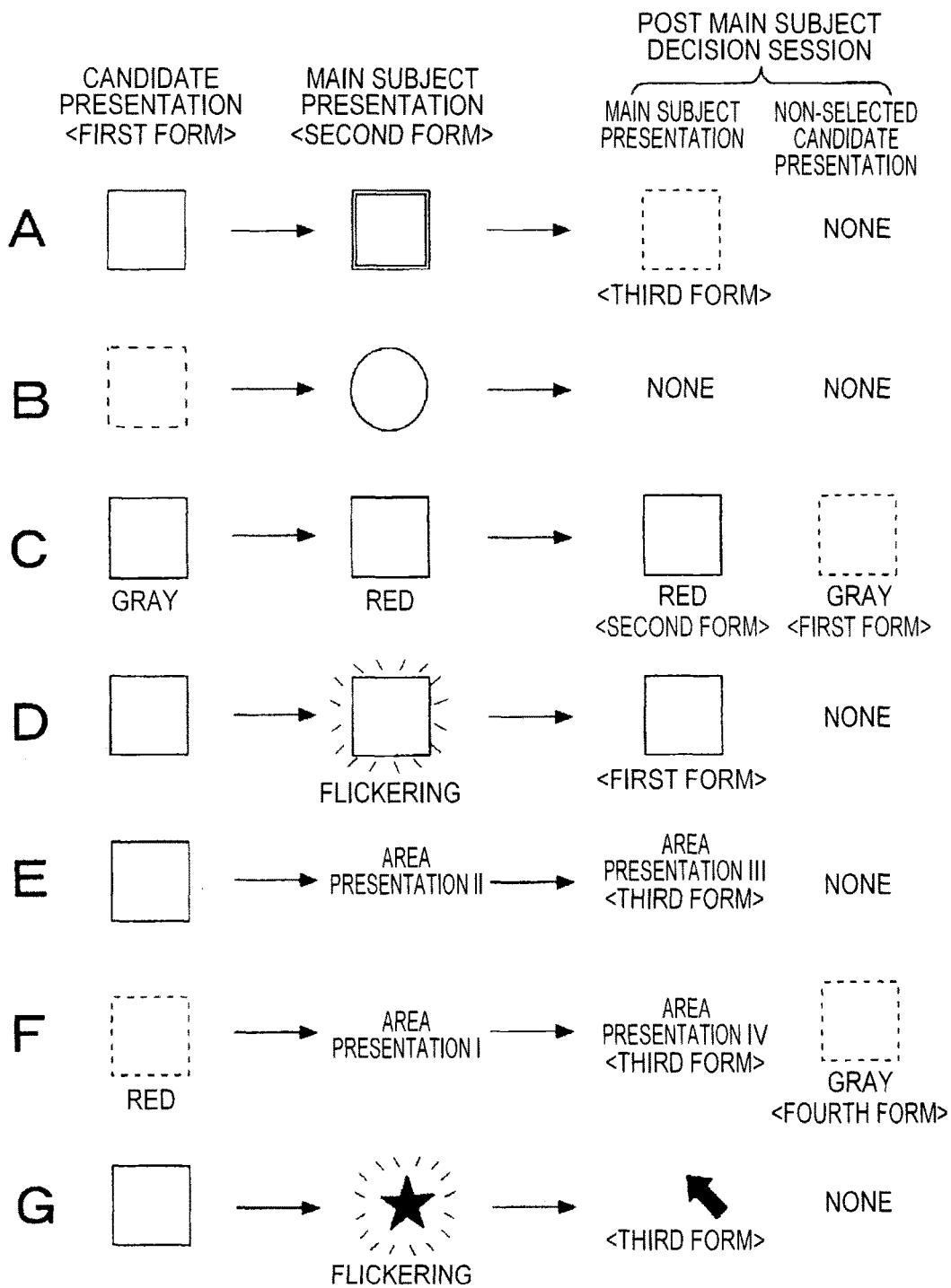
FIG. 15 is an illustrative diagram of transitions of presentation forms of an embodiment.

FIG. 15 shows an example of different display forms for the main subject presentation MA and candidate presentation KM (non-selected candidate presentation KMs).

Note that a "first form" is set to be a display form of the candidate presentation KM in the main subject determination session.

In addition, a "second form" is set to be a display form of the main subject presentation MA in the main subject decision time. "Third form" and "fourth form" mean different forms from the "first form" and "second form."

In FIG. 15A, the candidate presentation KM is performed using a solid-lined square frame (first form), and the main subject presentation MA is performed using a double-lined square frame (second form). In addition, the drawing is an example in which the main subject presentation MA is switched to be performed using a dashed-lined square frame (third form), and the non-selected candidate presentation KMs is not performed in the post main subject decision session.

In FIG. 15B, the candidate presentation KM is performed using the dashed-lined square frame (first form) and the main subject presentation MA is performed using a circular frame (second form). In addition, the drawing is an example in which the main subject presentation MA and the non-selected candidate presentation KMs are not performed in the post main subject decision session.

In FIG. 15C, the candidate presentation KM is performed using a gray square frame (first form) and the main subject presentation MA is performed using a red square frame (second form). In addition, the drawing is an example in which, in the post main subject decision session, the main subject presentation MA is performed in the second form without change and the non-selected candidate presentation KMs is also performed in the first form without change.

In FIG. 15D, the candidate presentation KM is performed using a square frame (first form) and the main subject presentation MA is performed using a flickering square frame (second form). In addition, the drawing is an example in which, in the post main subject decision session, the main subject is shown by performing only the main subject presentation MA in the first form and not performing the non-selected candidate presentation KMs.

In FIG. 15E, the candidate presentation KM is performed using the square frame (first form), and the main subject presentation MA is performed using the area presentation II (second form) shown in FIG. 14D. In addition, the drawing is an example in which, in the post main subject decision session, the main subject presentation MA is performed by switching to the area presentation III (third form) shown in FIG. 14E and the non-selected candidate presentation KMs is not performed.

In FIG. 15F, the candidate presentation KM is performed using a red dashed-lined square frame (first form), and the main subject presentation MA is performed using the area presentation I (second form) shown in FIG. 14C. In addition, the drawing is an example in which, in the post main subject decision session, the main subject presentation MA is performed by switching to the area presentation IV (third form) shown in FIG. 14F, and the non-selected candidate presentation KMs is performed using a gray dashed-lined square frame (fourth form).

In FIG. 15G, the candidate presentation KM is performed using the square frame (first form), and the main subject presentation MA is performed using a flickering star-shaped pointer (second form). In addition, the drawing is an example in which, in the post main subject decision session, the main subject presentation MA is performed by switching to an arrow pointer (third form), and the non-selected candidate presentation KMs is not performed.

The above cases are mere examples, and it is needless to say that changes of a display form can be more variously considered.

In any event, in terms of time, when a subject image for which the candidate presentation KM is performed as a candidate image is decided as a main subject, the main subject presentation MA is performed in a different display form different from one in the candidate presentation KM.

In addition, when the main subject presentation MA and the non-selected candidate presentation KMs are performed within an image at the same time, the main subject presentation MA and the non-selected candidate presentation KMs are performed in different display forms.

4-3: First Example of the Display Control Process

A specific process example of the control unit 30 (display control unit 1) for performing the main subject presentation MA and the candidate presentation KM (including KMs) as described above will be described.

First, when the main subject determination process starts, the CPU 30 starts the display control process for performing the main subject presentation MA and the candidate presentation KM (including KMs) as Step F10 as previously described in FIG. 4. In other words, the display control process is performed in parallel with the main subject determination process.

Figure 16:
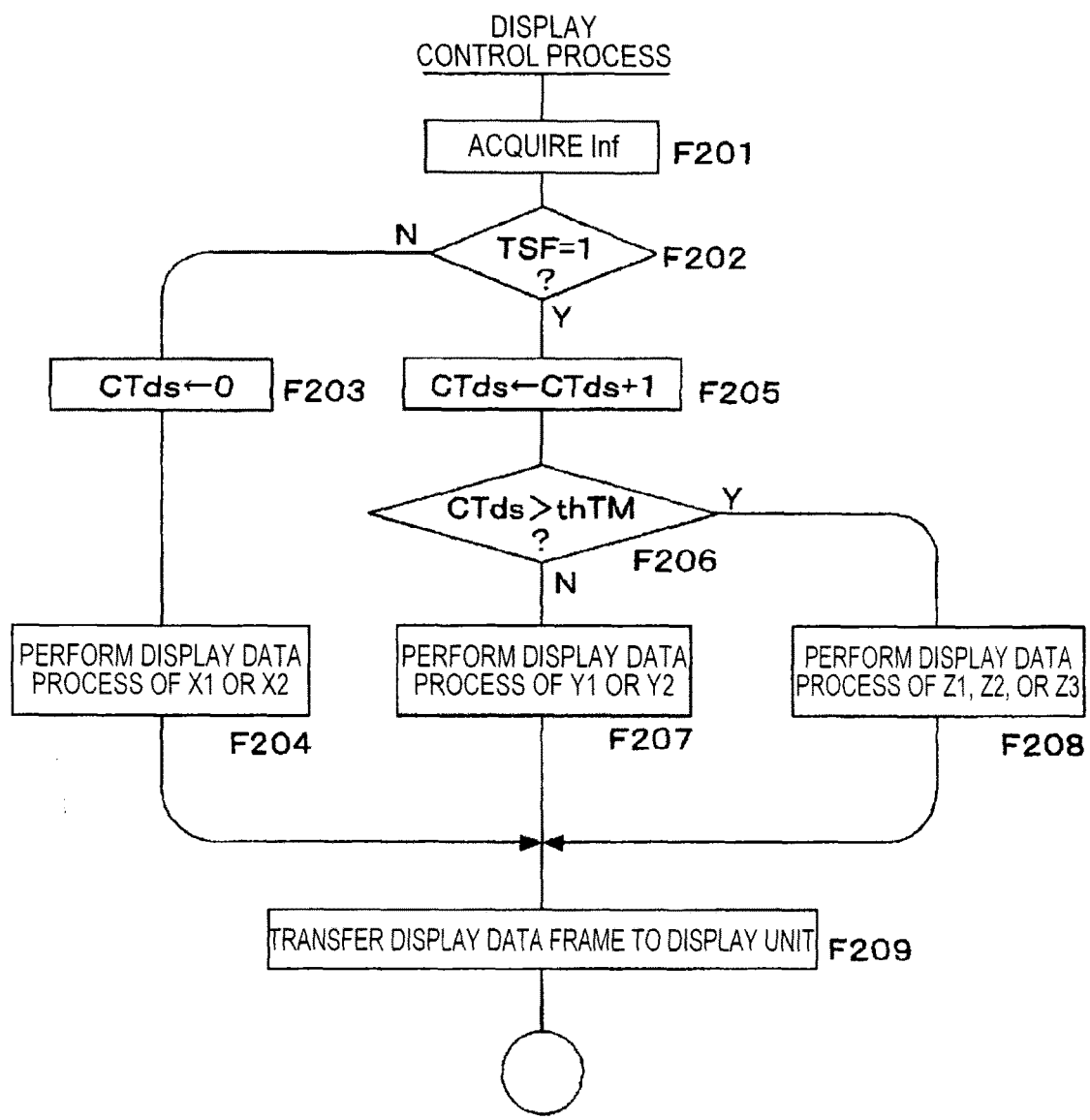
FIG. 16 is a flowchart of a first example of the display control process of an embodiment

The process example executed by the CPU 30 (display control unit 1) as the display control process is shown in FIG. 16. The first example of the display control process shown in FIG. 16 is a process example when a display operation of any of (ex1), (ex2), and (ex3) described above is performed.

In addition, the example is assumed to be an example in which the main subject presentation MA and the candidate presentation KM (including KMs) are performed using frames or pointers.

Note that Step F201 of FIG. 16 can be regarded as corresponding to Step F1 of FIG. 2, Steps F202 to F208 to Step F2 of FIG. 2, and Step F209 to Step F3 of FIG. 2.

The control unit 30 performs the process of FIG. 16, for example, each time one frame of a captured image for generating a through image is transferred from the digital signal processing unit 20.

The control unit 30 acquires and checks the main subject determination process information Inf of that time for display control as Step F201.

To be specific, the control unit checks the variable TSF indicating whether or not a main subject has been set, candidate image frame information (a position of a candidate image within a screen (a pixel area, the position of the center of gravity, or the like)), as well as main subject information when a main subject is decided (a position of an image set as a main subject (a pixel area, the position of the center of gravity, or the like)) previously described in FIG. 8.

The control unit 30 causes the process of Step F202 based on whether or not the variable TSF=1 is satisfied, in other words, whether or not a main subject has been decided to branch.

When a main subject has not yet been decided, which corresponds to the main subject determination session, the control unit 30 advances the process to Step F203 to reset a display control counter CTds.

Figure 17:
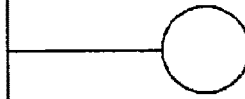
FIG. 17 is a flowchart of the display data process in a main subject determination session of the embodiment.

Then, the control unit 30 performs a display data process of X1 or X2 described above in Step F204. The display data processes of X1 and X2 are shown in FIGS. 17A and 17B.

When the display operation of (ex3) described above is employed, for example, the control unit 30 performs the display data process of X1 of FIG. 17A in Step F204. In other words, as Step F220 of FIG. 17A, frame image data transmitted for through image display undergoes general processing for a through image (for example, resizing of image data, or the like), and thereby display data of one frame is generated. A process for the candidate presentation KM is not performed.

When the display operation of (ex1) or (ex2) described above is employed, for example, the control unit 30 performs the display data process of X2 of FIG. 17B in Step F204. In other words, as Step F225 of FIG. 17B, one or a plurality of positions of the candidate presentation KM are set based on the candidate image frame information.

Then, the control unit 30 performs a process of adding the candidate presentation KM to a current captured image data frame in a first form in Step F226. For example, a process of superimposing marks such as frames or pointers is performed such that the candidate presentation KM is executed in the first form in the positions (areas) of the candidate images in a through image. The captured image data frame to which the candidate presentation KM is added as above is processed to be a through image, and thereby display data of one frame is generated.

After the process of Step F204 described above ends, the control unit 30 proceeds to Step F209 to cause the display data generated in Step F204 to be transferred and output as one frame of the through image to be displayed on the display unit 34.

When the variable TSF=1 is determined in Step F202, in other words, when a main subject has been decided and thereafter, the control unit 30 advances the process to Step F205 to cause the display control counter CTds to increase (CTds←CTds+1).

Since the display control counter CTds is reset in Step F203 in the main subject determination session, a value of the display control counter CTds indicates the elapsed time from the main subject decision time.

Then, the control unit 30 checks whether or not the value of the display control counter CTds exceeds a predetermined time thTM in Step F206.

This process is a process of determining whether the present is the "main subject decision time" or "post main subject decision session" described above.

As described above, the period immediately after a main subject is decided, i.e., a period from when a main subject is decided to the predetermined time thTM is set as the "main subject decision time." This is a period in which it is highly desirable to present a decided main subject to a user.

The control unit 30 determines that it is the "main subject decision time" when CTds≤thTM, and then proceeds to Step F207. Then the display data process of Y1 or Y2 described above is performed. The display data processes of Y1 and Y2 are shown in FIGS. 18A and 18B.

When the display operation of (ex1) described above is employed, for example, the control unit 30 performs the display data process of Y1 of FIG. 18A in Step F207. In other words, as Step F231 of FIG. 18A, a position of the main subject presentation MA is set based on the main subject information.

Then, the control unit 30 performs a process of adding the main subject presentation MA to the current captured image data frame in a second form in Step F232. For example, a process of superimposing a mark such as a frame or a pointer is performed such that the main subject presentation MA is executed in the second form in the position (area) of a main subject in a through image. The captured image data frame to which the main subject presentation MA is added as above is processed to be a through image, and thereby display data of one frame is generated.

In addition, when the display operations of (ex2) and (ex3) described above are employed, for example, the control unit 30 performs the display data process of Y2 of FIG. 18B in Step F207. In other words, as Step F235 of FIG. 18B, a position of the main subject presentation MA and a position of the non-selected candidate presentation KMs are set based on the main subject information and the candidate image frame information.

Then, the control unit 30 performs a process of adding the main subject presentation MA in a second form and the non-selected candidate presentation KMs in a first form or still another form to the current captured image data frame in Step F236.

For example, a process of superimposing a mark such as a frame or a pointer is performed such that the main subject presentation MA of the second form is executed in the position (area) of the main subject within an image. Furthermore, a process of superimposing a mark such as a frame or a point as the non-selected candidate presentation KMs is performed in the area of another candidate image in the first form the same as that in the main subject determination session or another form different from the first and second forms.

The captured image data frame to which the main subject presentation MA and the non-selected candidate presentation KMs are added as above is processed to be a through image, and thereby display data of one frame is generated.

When the process of Step F207 described above ends, the control unit 30 proceeds to Step F209 to cause the display data generated in Step F207 to be transferred and output as one frame of a through image to be displayed on the display unit 34.

After it is determined first that the variable TSF=1 in Step F202, the display control counter CTds increases in Step F205 in, for example, each frame period, and thus CTds>thTM is attained at a certain time point in Step F206.

Figure 19:
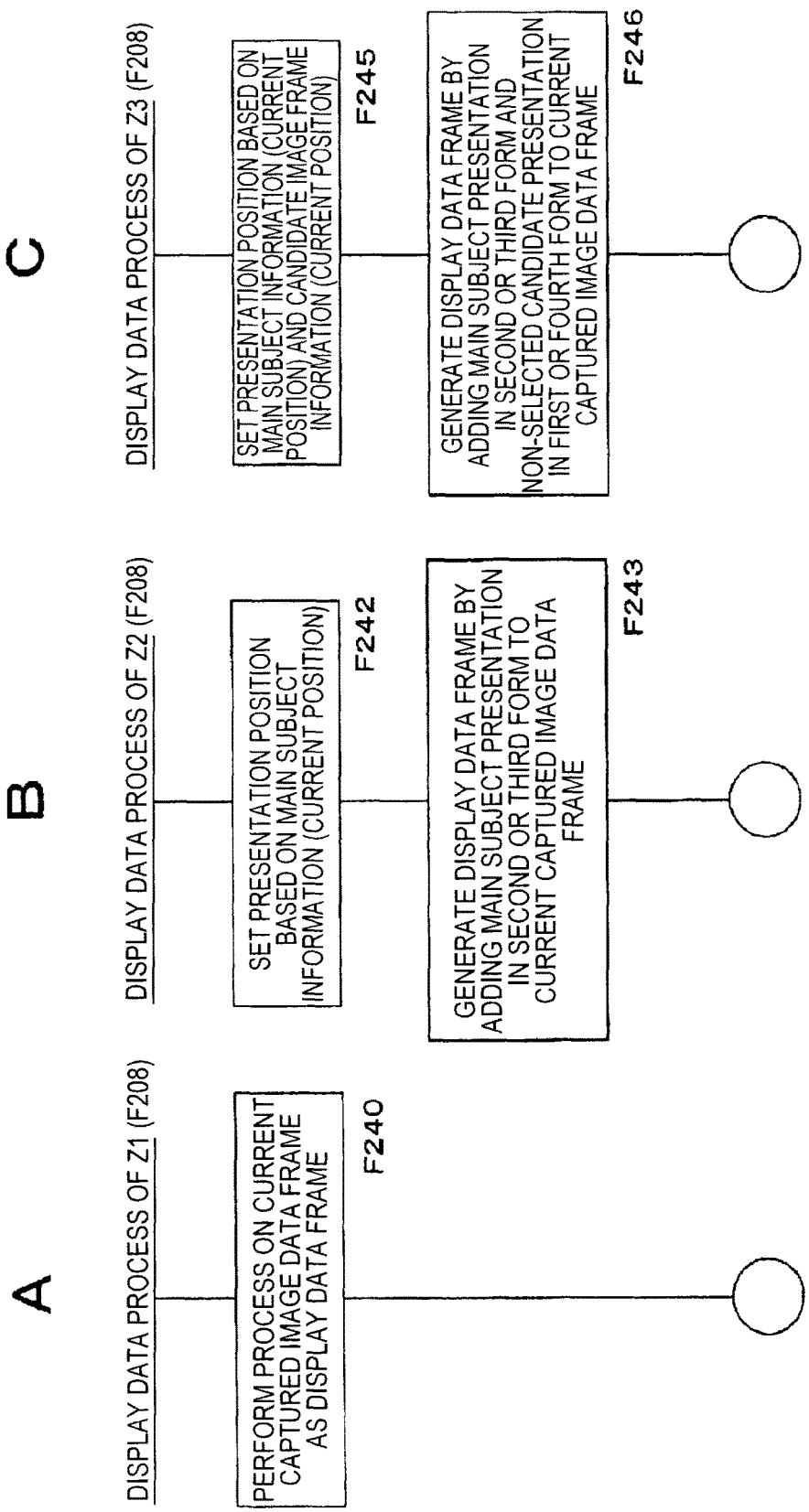
FIG. 19 is a flowchart of the display data process in a post main subject decision session of the embodiment.

In this case, the control unit 30 determines that it is the "post main subject decision session" and then proceeds to Step F208. Then, a display data process of any of Z1, Z2, and Z3 described above is performed. The display data processes of Z1, Z2, and Z3 are shown in FIGS. 19A, 19B, and 19C.

When the display data process of Z1 of FIG. 19A is employed, the control unit 30 performs general processing on frame image data transferred for through image display to be a through image (for example, resizing of image data or the like) thereby generating display data of one frame in Step F240. A process for the main subject presentation MA or the non-selected candidate presentation KMs is not performed.

When the display data process of Z2 of FIG. 19B is employed, the control unit 30 sets a position of the main subject presentation MA based on the main subject information in Step F242.

Then, the control unit 30 performs a process of adding the main subject presentation MA to the current captured image data frame in a second form or a third form in Step F243. For example, a process of superimposing a mark such as a frame or a pointer is performed such that the main subject presentation MA is executed in the second form or the third form in the position (area) of the main subject within an image of a current frame. The captured image data frame to which the main subject presentation MA is added as above is processed to be a through image, and thereby display data of one frame is generated.

When the display data process of Z3 of FIG. 19C is employed, the control unit 30 sets a position of the main subject presentation MA and a position of the non-selected candidate presentation KMs based on the main subject information and candidate image frame information in Step F245.

Then, the control unit 30 performs a process of adding the main subject presentation MA in a second form or a third form and the non-selected candidate presentation KMs in a first form or a fourth form to the current captured image data frame in Step F246.

For example, a process of superimposing a mark such as a frame or a pointer is performed such that the main subject presentation MA of the second form or the third form is executed in the position (area) of the main subject within an image. Furthermore, the process of superimposing a mark such as a frame or a pointer of the non-selected candidate presentation KMs as the first form or the fourth form is performed in the area of another candidate image.

The captured image data frame to which the main subject presentation MA and the non-selected candidate presentation KMs are added as above is processed to be a through image, and thereby display data of one frame is generated.

When the process of Step F208 as described above ends, the control unit 30 proceeds to Step F209 to cause the display data generated in Step F208 to be transferred and output as one frame of the through image to be displayed on the display unit 34.

Through the processes described in FIGS. 16 to 19 hereinabove, the display operations described using (ex1) to (ex3) above are realized.

4-4: Second Example of the Display Control Process

A second example of the display control process of the control unit 30 for performing the main subject presentation MA and the candidate presentation KM (including KMs) will be described.

Figure 20:
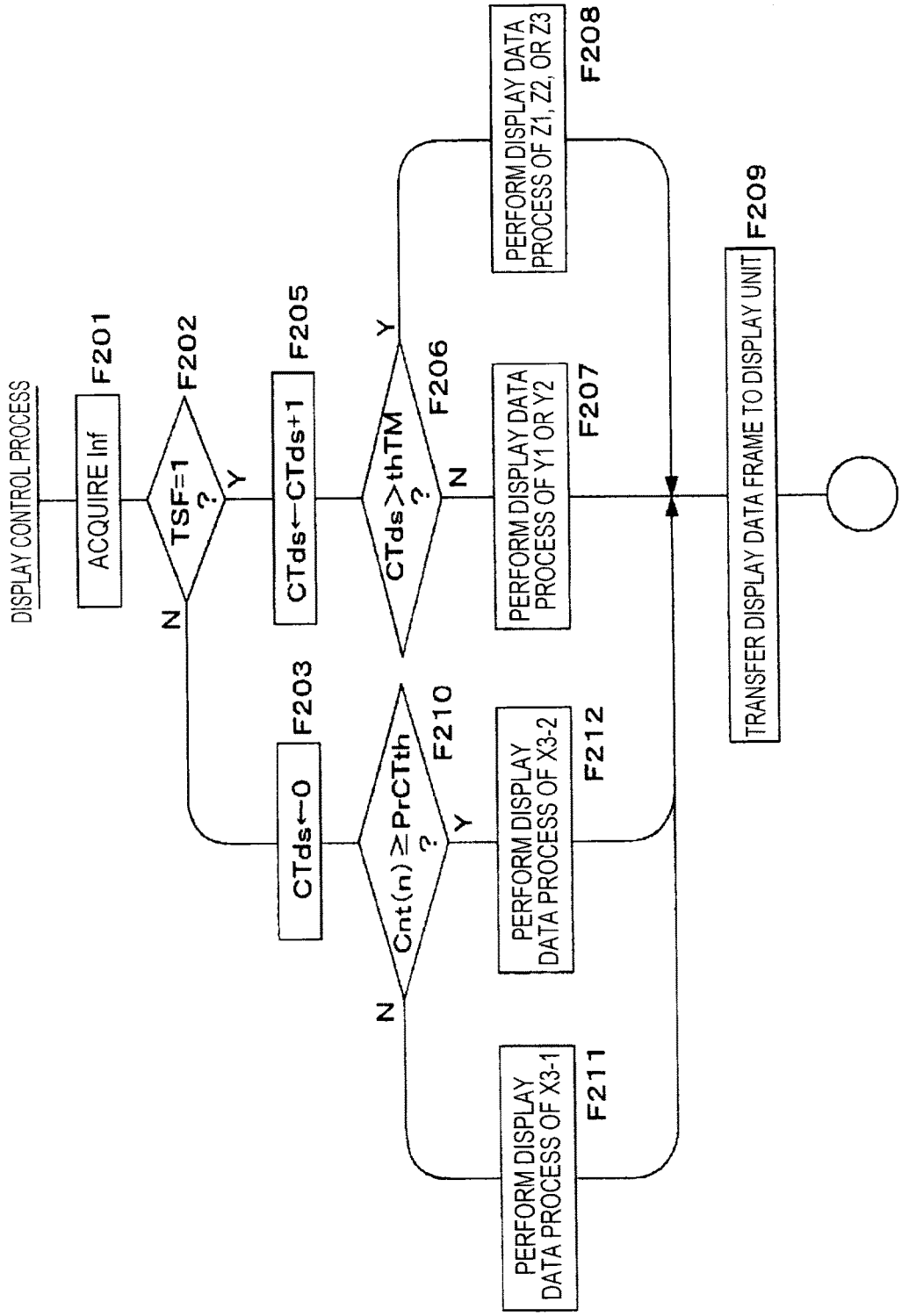
FIG. 20 is a flowchart of a second example of the display control process of the embodiment.

FIG. 20 shows a process example executed by the CPU 30 (display control unit 1) as the second display control process. The second example of the display control process is a process example when a display operation of (ex4) or (ex5) described above is performed. In other words, it is an example in which the candidate presentation KM is first performed when a candidate image is generated (X3-1) and then the potential candidate presentation KMv is performed when a candidate image that is likely to be selected as a main subject is generated according to the progress of the main subject determination process (X3-2) in the period of the main subject determination session.

Note that repetitive description will be avoided by giving the same step numbers to the same processes of FIG. 20 as those of FIG. 16. In addition, Step F201 of FIG. 20 can be regarded as corresponding to Step F1 of FIG. 2, Step F209 to Step F3 of FIG. 2, and other steps to Step F2.

The control unit 30 performs the process of FIG. 20, for example, each time one frame of a captured image for generating a through image is transferred from the digital signal processing unit 20.

The control unit 30 acquires and checks the main subject determination process information Inf of that time point for display control as Step F201.

As previously described in FIG. 16, checking the variable TSF indicating whether or not a main subject has been set, the candidate image frame information and the main subject information is the same, however, in the example of FIG. 20, a count value Cnt(n) is also checked.

As described in FIG. 8, "n" indicates a natural number such as 1, 2, 3, . . . , and the count value Cnt(n) is a count value for determining a degree of stable presence corresponding to a detected candidate image frame E(n) such as the candidate image frame E1, E2, or E3. When, for example, three candidate image frames E1, E2, and E3 are detected, the count value Cnt(n) indicates each of Cnt1, Cnt2, and Cnt3.

The control unit 30 causes the process of Step F202 based on whether or not the variable TSF=1 is satisfied, in other words, whether or not a main subject has been decided to branch.

When a main subject has not yet been decided, which corresponds to the main subject determination session, the control unit 30 advances the process to Step F203 to reset the display control counter CTds.

Then, the control unit 30 determines whether or not the count value Cnt(n), i.e., for example, each of the count values Cnt1, Cnt2, and Cnt3 of each of the candidate image frame E1, E2, and E3 is equal to or greater than a threshold value PrCTth as Step F210.

The threshold value PrCTth is set to be a value slightly smaller than the count threshold value CTthr to be determined as a main subject described in FIG. 8.

In other words, the process of Step F210 is a process of determining whether or not an image is a candidate having a count value Cnt(n) that is a value that is likely to reach the count threshold value CTthr soon (whether or not the image is a candidate image that is likely to be determined as a main subject).

If it is not a candidate image frame satisfying Cnt(n)≥PrCTth, the process proceeds to Step F211, and the control unit 30 performs a display data process of X3-1 described above. The display data process of X3-1 is shown in FIG. 21A.

The control unit 30 sets one or a plurality of positions of the candidate presentation KM based on the candidate image frame information in Step F251.

Then, the control unit 30 performs a process of superimposing marks such as frames or pointers on the positions (areas) of candidate images in order to add the candidate presentation KM to the current captured image data frame in a first form in Step F252. The captured image data frame to which the candidate presentation KM is added above is processed to be a through image, and thereby display data of one frame is generated.

When the process of Step F211 described above ends, the control unit 30 proceeds to Step F209 to cause the display data generated in Step F211 to be transferred and output as one frame of the through image to be displayed on the display unit 34.

When a candidate image frame satisfying Cnt(n)≥PrCTth is generated at a certain time point, the control unit 30 proceeds to Step F212 from F210, and performs the display data process of X3-2 described above. The display data process of X3-2 is shown in FIG. 21B.

The control unit 30 sets one or a plurality of positions of the candidate presentation KM based on the candidate image frame information in Step F261.

Then, the control unit 30 performs a process of superimposing a mark such as a frame or a pointer such that the potential candidate presentation KMv is added to the position (area) of the candidate image satisfying Cnt(n)≥PrCTth in a form other than the first and second forms in Step F262. Furthermore, the process of superimposing marks such as frames or pointers is performed in the positions (areas) of other candidate images such that the candidate presentation KM is executed in the first form.

The captured image data frame to which the candidate presentation KM and the potential candidate presentation KMv are added as above is processed to be a through image, and thereby display data of one frame is generated.

Note that, when there is one candidate image frame and it is set as a potential candidate, of course only the potential candidate presentation KMv is performed on the screen while the other candidate presentation KM is not performed.

When the process of Step F212 described above ends, the control unit 30 proceeds to Step F209 to cause the display data generated in Step F212 to be transferred and output as one frame of the through image to be displayed on the display unit 34.

The processes performed in and after the main subject decision time (Steps F205 to F208, and F209) will not be described since they are the same as those of FIG. 16.

Figure 21:
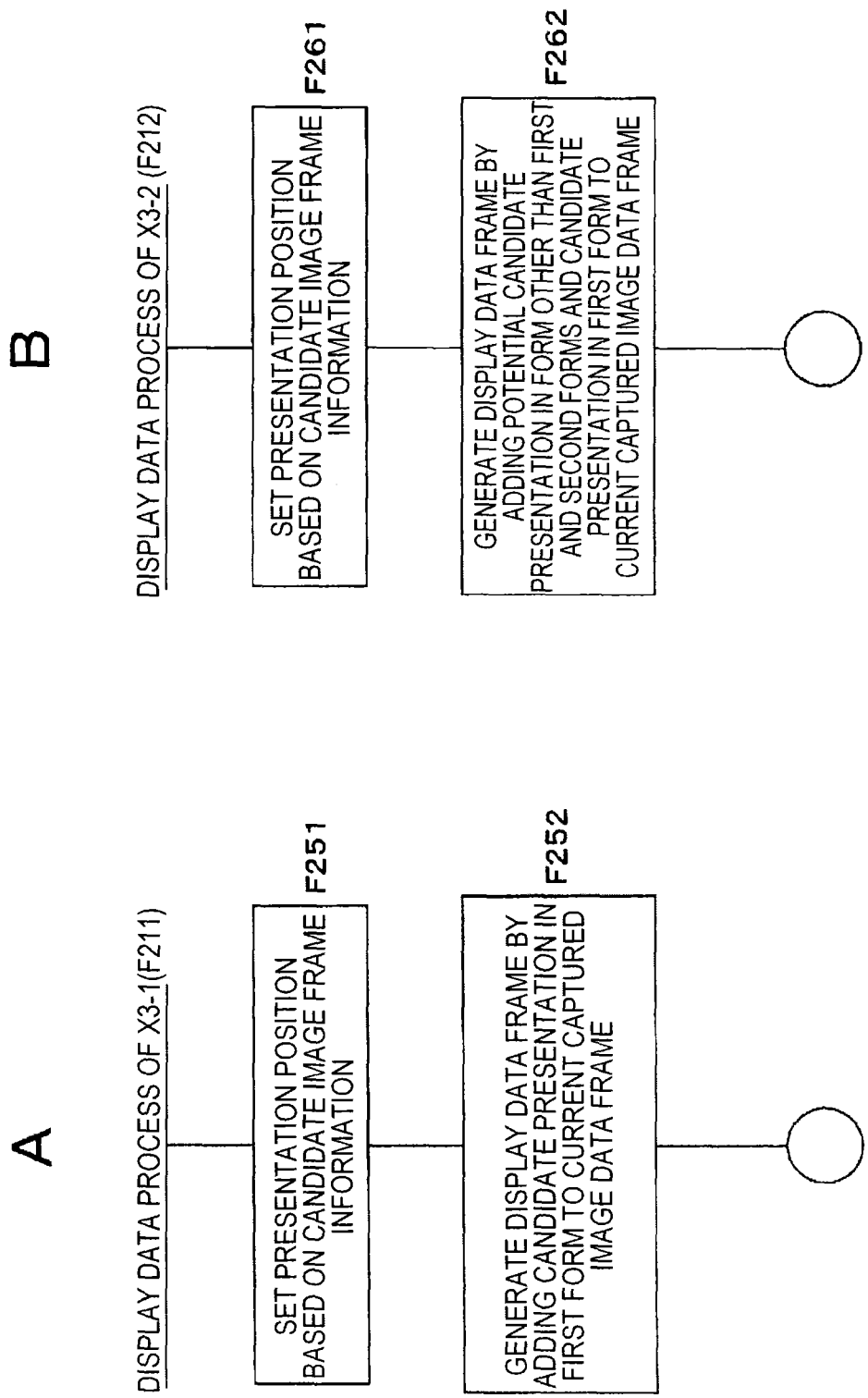
FIG. 21 is a flowchart of the display data process before determination of the embodiment.

Through the processes described in FIGS. 20 and 21 above, the display operations described using (ex4) and (ex5) above are realized.

4-5: Process for Area Presentation (Use of a Subject Extraction Map)

In the first and second examples of the display control process described above, the main subject presentation MA and the candidate presentation KM are described to be superimposed by marks such as a frame or a pointer, but as described in FIG. 14, the main subject presentation MA, the candidate presentation KM, or the like may be performed using the technique of area presentation.

Herein, a technique of area presentation using a subject map will be described.

Figure 22:
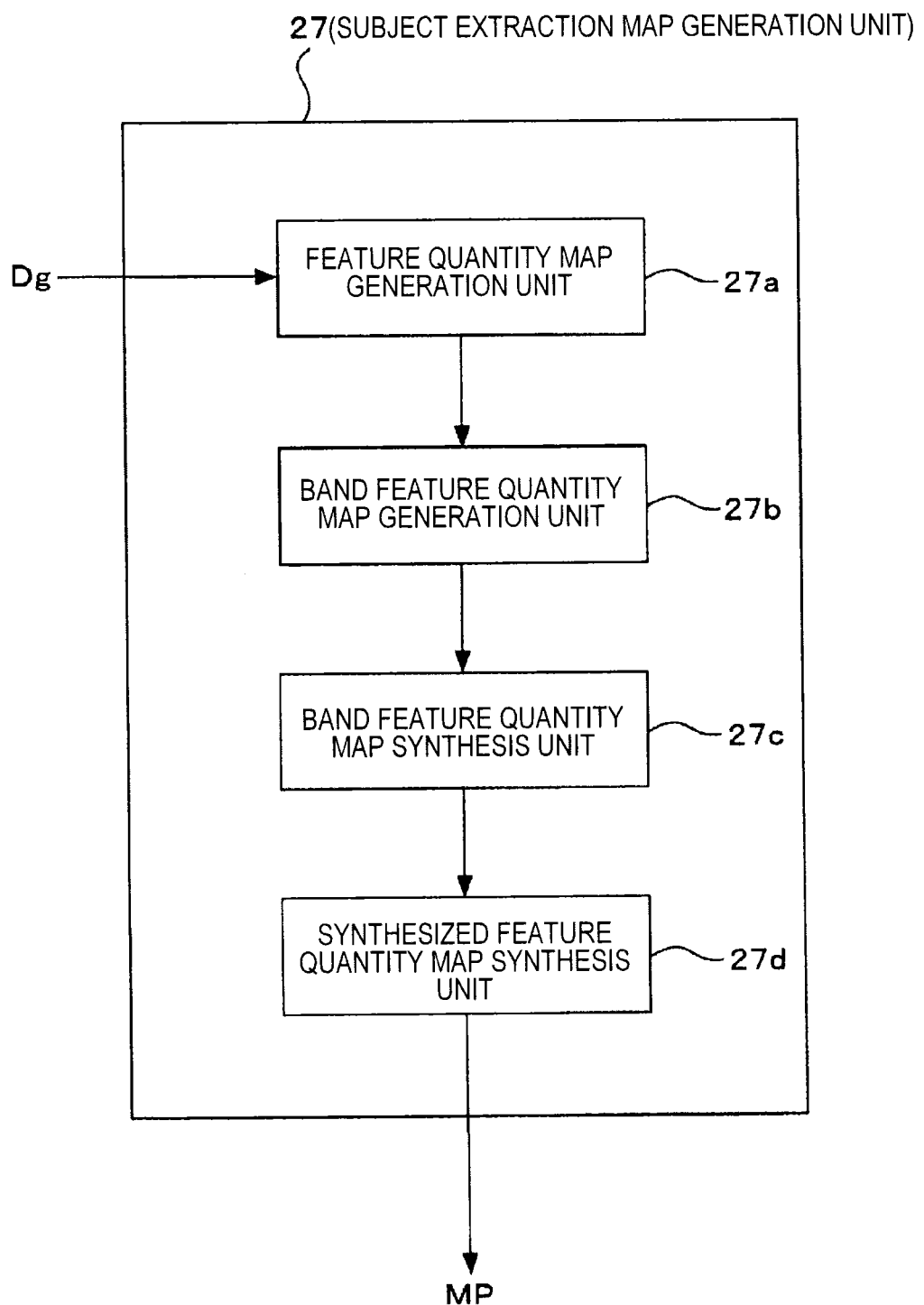
FIG. 22 is a block diagram of a subject map generation unit of an embodiment.
Figure 23:
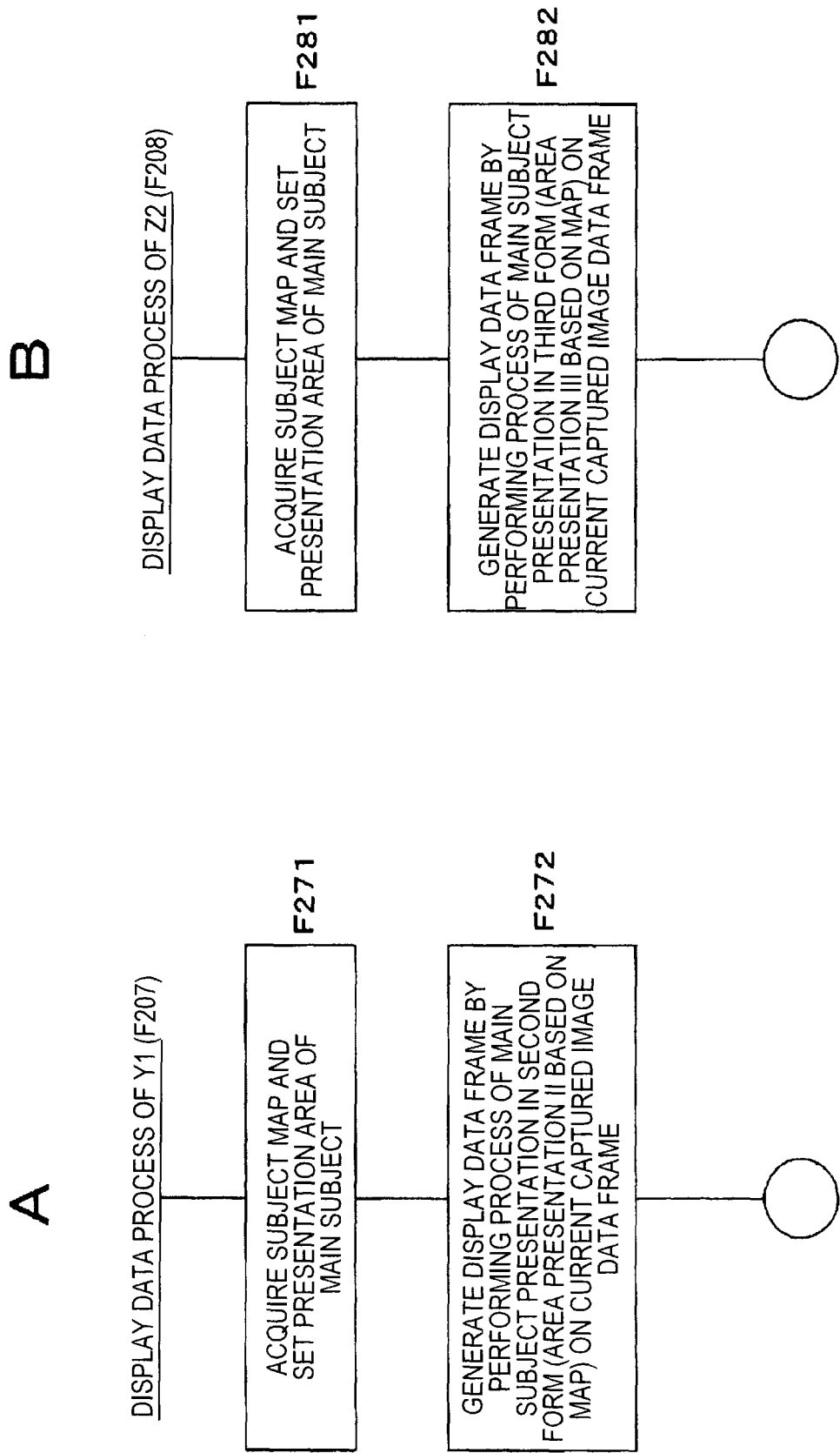
FIG. 23 is a flowchart of the display data process of opposite presentation and after determination of an embodiment.

First, in FIG. 22, a configuration example of the subject extraction map generation unit 27 shown in FIG. 3 will be described.

The subject map generation unit 27 is constituted by a feature quantity map generation unit 27a, a band feature quantity map generation unit 27b, a band feature quantity map synthesis unit 27c, and a synthesized feature quantity map synthesis unit 27d.

A plurality of input images that are continuously captured in terms of time by the imager 12 and processed by the pre-processing unit 21 to the YC generation unit 23 are sequentially supplied to the subject map generation unit 27.

First, the feature quantity map generation unit 27a extracts feature quantities of features such as luminance, color, and the like from each area of an input image to generate feature quantity maps indicating the extracted feature quantities, and then supplies the map to the band feature quantity map generation unit 27b.

The band feature quantity map generation unit 27b generates band feature quantity maps by extracting specific band components from the feature quantity maps from each of the feature quantity maps supplied from the feature quantity map generation unit 27a, and then supplies the band feature quantity map to the band feature quantity map synthesis unit 27c. The band feature quantity maps are generated for each band with regard to each feature.

With regard to the band feature quantity maps of each of the feature quantities, the band feature quantity map synthesis unit 27c selects any one feature quantity of the band feature quantity map for each pixel based on a band reliability index. The band feature quantity map synthesis unit 27c generates a synthesized feature quantity map by synthesizing the selected feature quantity of each pixel with all pixels (employing the selected feature quantity as a feature quantity of each pixel). In other words, band feature quantity maps of the same feature are synthesized based on the band reliability index, and then set as a synthesized feature quantity map of each feature.

The band feature quantity map synthesis unit 27c supplies the synthesized feature quantity maps generated with regard to each feature to the synthesized feature quantity map synthesis unit 27d.

With regard to the synthesized feature quantity maps supplied from the band feature quantity map synthesis unit 27c, the synthesized feature quantity map synthesis unit 27d selects any one feature quantity of each of the synthesized feature quantity maps for each pixel based on the synthesis reliability index. The synthesized feature quantity map synthesis unit 27d generates a subject map MP by synthesizing the feature quantity selected for each pixel with all pixels (employing the selected feature quantity as a feature quantity of each pixel).

The control unit 30 (display control unit 1) can perform the main subject presentation MA, the candidate presentation KM, or the like using the area presentation in, for example Step F207, F208, and the like of FIGS. 16 and 20 above by using the subject extraction map MP generated by the subject extraction map generation unit 27 as above.

FIG. 23A shows an example of the case in which the main subject presentation MA is performed as the display data process of Y1 described above using the area presentation in Step F207.

The control unit 30 acquires a subject map from the subject extraction map generation unit 27 in Step F271. Then, the control unit 30 sets a presentation area of a main subject based on the subject map.

Then, the control unit 30 performs a process of adding the main subject presentation MA to a current captured image data frame in a second form in Step F272. In this case, in the pixel area of the main subject set based on the subject map, a process of any of the area presentation I to IV (for example, the area presentation IT is set to be selected for the second form) described in FIG. 14 is performed. Then, a captured image data frame to which the main subject presentation MA is added as the area presentation II is processed to be a through image, and thereby display data of one frame is generated.

Note that, in a process example as the display data process of Y2, the techniques of the area presentation I to IV may be used for, for example, the main subject presentation MA or the non-selected candidate presentation KMs.

FIG. 23B shows an example when the main subject presentation MA is performed using the area presentation as the above-described display data process of Z2 in Step F208 of FIGS. 16 and 20.

The control unit 30 acquires the subject map from the subject extraction map generation unit 27 in Step F281. Then, the control unit sets a presentation area of the main subject based on the subject map.

Then, the control unit 30 performs a process of adding the main subject presentation MA in a third form to a current captured image data frame in Step F282. In this case, the process of, for example, the area presentation III as the third form is performed on the pixel area of the main subject set based on the subject map. Then, the captured image data frame to which the main subject presentation MA is added as the area presentation III is processed to be a through image, and thereby display data of one frame is generated.

Note that, in a process example of the display data process of Z3, the techniques of the area presentation I to IV may be used for, for example, the main subject presentation MA and the non-selected candidate presentation KMs.

Furthermore, the techniques of the area presentation I to IV may be used for the candidate presentation KM also in process examples of the display data processes of X2 and X3 in the main subject determination session.

As above, for example, the main subject presentation MA and the candidate presentation KM can be executed using the techniques of the area presentation. When the techniques of the area presentation are used, a main subject and an area serving as a candidate image can be delivered to a user with more clarity.

5. Application to a Program and a Computer Device

Hereinabove, the embodiments of the display control unit 1 (display control device) and the imaging apparatus 10 have been described, and the display control process and the main subject determination process described above can be executed by hardware or software.

A program as an embodiment is a program for causing an arithmetic operation processing device, for example, a CPU (Central Processing Unit), a DSP (Digital Signal Processor), or the like to execute the processes shown in the embodiments described above.

In other words, the program causes the arithmetic operation processing device to execute a display image data process performed on image data that is subject to the main subject determination process such that candidate presentation based on candidate image information and main subject presentation based on main subject information are performed in different display forms.

In addition, the program causes the arithmetic operation processing device to execute a process of outputting image data obtained in the display image data process as display data to be supplied to the display unit.

To be specific, the program of the embodiment may be said to be a program that causes the arithmetic operation processing device to execute the display control processes shown in FIG. 2 or FIGS. 16 to 21, and FIG. 23.

A device that executes the display control processes described above through the program can be realized using the arithmetic operation processing device.

Such a program can be recorded in advance on an HDD as a recording medium installed in equipment such as a computer device, a ROM in a microcomputer having a CPU, or the like.

Alternatively, such a program can be temporarily or permanently stored (recorded) in a removable recording medium such as a flexible disk, a CD-ROM (Compact Disc Read Only Memory), a MO (Magnet optical) disc, a DVD (Digital Versatile Disc), a Blu-ray disc, a magnetic disk, a semiconductor memory, or a memory card. Such a removable recording medium can be provided as so-called package software.

In addition, such a program can be not only installed in a personal computer or the like from a removable recording medium, but also downloaded from a downloading site through a network such as a LAN (Local Area Network), or the Internet.

In addition, such a program is suitable for being provided to a variety of display control devices of the embodiment. For example, by downloading the program in a personal computer, a portable information processing device, a mobile telephone, a game device, a video device, a PDA (Personal Digital Assistant) or the like, the portable information processing device or the like can be set as the display control device of the present disclosure.

For example, in a computer device as shown in FIG. 24, the same process as the display control process performed in the display control device 1 of FIG. 1 and the imaging apparatus 10 can be set to be executed.

In FIG. 24, a CPU 71 of a computer device 70 executes various processes according to a program stored in a ROM 72 or a program loaded on a RAM 73 from a storage unit 78. In addition, data and the like necessary for the CPU 71 to execute the various processes are also appropriately stored in the RAM 73.

The CPU 71, ROM 72, and RAM 73 are connected to one another via a bus 74. In addition, an input and output interface 75 is also connected to the bus 74.

An input unit 76 that includes a keyboard, a mouse, and the like, an output unit 77 that includes a display including a CRT (Cathode Ray Tube), an LCD, or an organic EL panel, a speaker, and the like, the storage unit 78 constituted by a hard disk and the like, and a communication unit 79 constituted by a modem, and the like are connected to the input and output interface 75. The communication unit 79 performs communication processes via a network including the Internet.

In addition, a drive 80 is connected to the input and output interface 75 if necessary, a removable medium 81 such as a magnetic disk, an optical disc, a magneto-optical disc, or a semiconductor memory is appropriately loaded thereon, and a computer program read from the medium is installed in the storage unit 78 if necessary.

When the display control process or the main subject determination process described above is executed by software, a program constituting the software is installed from a network or a recording medium.

The recording medium is configured to be the removable medium 81 including a magnetic disk (including a flexible disk), an optical disc (including a Blu-ray disc (Blu-ray Disc (registered trademark), a CD-ROM (Compact Disc-Read Only Memory), a DVD (Digital Versatile Disc)), a magneto-optical disc (including MD (Mini Disc)), a semiconductor memory, or the like with a program recorded thereon, which is distributed separate from the main body of the device as shown in, for example, FIG. 24 to deliver the program to users. Alternatively, the recording medium is also configured to be a ROM 72, a hard disk included in the storage unit 78, or the like with a program recorded thereon, which is delivered to users in a state of being incorporated into the main body of the device beforehand.

As above, when dynamic image data is input to the computer device 70 through a reception operation performed by the communication unit 79, a reproduction operation performed in the drive 80 (or removable medium 81) or the recording unit 78, or the like, the CPU 71 executes the functions of the display control unit 1 and the main subject determination unit 2 described above based on the program. In other words, with regard to display control, the processes as shown in FIG. 2, FIGS. 16 to 21, and FIG. 23 are executed. With regard to the main subject determination process, the processes as shown in FIGS. 4 and 8 are executed. Main subject determination is performed on image data input through the processes, and a candidate in the course of determination and a main subject are precisely presented to a user as a determination result.

6. Modified Example

With regard to the embodiments, various modified examples are considered.

In the embodiments, performing main subject determination on a captured image and a display operation of that time have been described on the assumption of, for example, a still image capturing operation, however, performing the main subject determination process on a reproduction image is also considered. Thus, the display control process for performing the candidate presentation KM and the main subject presentation MA can also be applied when image data is reproduced.

In addition, the main subject determination process can of course be considered to be performed during standby of capturing of a dynamic image and capturing and recording of a dynamic image, and accordingly, the above-described display control process is performed.

Furthermore, the main subject information has been described as being used also in an image effect process and image editing process, but since the display control process described above is performed during the execution of image editing or the like, display that editors or the like easily recognize can be realized.

A display form is not limited to those exemplified in FIGS. 13 and 14. In addition, an example of a change of a display form is variously considered in addition to those shown in FIG. 15.

In any event, the main subject presentation MA and the candidate presentation KM may be performed in different forms in terms of time or image space.

In addition, each of the candidate presentation in a first form, main subject presentation in a second form, and potential candidate presentation may be performed in different displays or a part thereof may be performed in the same display.

Additionally, the present technology may also be configured as below.

(1)

A display control device including:

a display image processing unit configured to perform a display image data process that is an image data process for display on image data that is a target of a main subject determination process such that at least candidate presentation for a candidate image set as a candidate for a main subject in the main subject determination process based on candidate image information and main subject presentation based on main subject information of a determination result of the main subject determination process are performed in different display forms; and a display data output unit configured to output image data processed by the display image processing unit as display data to be supplied to a display unit.

(2)

The display control device according to (1), wherein the display image processing unit performs the display image data process such that, in a main subject determination session that is a period from a start of the main subject determination process to decision of a main subject, the candidate presentation is performed in a first form to present the candidate image, and when the main subject is determined in the main subject determination process, the main subject presentation is performed in a second form to present the main subject.

(3)

The display control device according to (2), wherein the display image processing unit performs the display image data process such that, when a main subject is determined in the main subject determination process, the candidate presentation is performed on a candidate image that is not determined as the main subject in a form other than the second form, in addition to the main subject presentation in the second form.

(4)

The display control device according to (1), wherein the display image processing unit performs the display image data process such that, when a main subject is determined in the main subject determination process, the candidate presentation is performed in a first form to present a candidate image that is not determined as a main subject, and the main subject presentation is performed in a second form to present the main subject.

(5)

The display control device according to any one of (1) to (4), wherein the display image processing unit performs the display image data process such that, when a main subject is determined in the main subject determination process, the main subject presentation is performed to present the main subject, and then the main subject presentation is changed to a different form.

(6)

The display control device according to any one of (1) to (5), wherein the display image processing unit performs the display image data process such that, in a post main subject decision session of the main subject determination process, the candidate presentation is performed on a candidate image that is not determined as the main subject in a different form from a form of the main subject presentation.

(7)

The display control device according to any one of (1) to (6), wherein the display image processing unit performs the display image data process such that, in a main subject determination session that is a period from a start of the main subject determination process to decision of a main subject, the candidate presentation is performed in a first form, and further, potential candidate presentation is performed in a different form from the first form to present a candidate image that is regarded as being highly likely to be determined as a main subject among candidate images.

(8)

The display control device according to any one of (1) to (7), wherein the display image processing unit performs the display image data process such that at least one of the main subject presentation and the candidate presentation is executed through display showing a corresponding portion of a frame.

(9)

The display control device according to any one of (1) to (8), wherein the display image processing unit performs the display image data process such that at least one of the main subject presentation and an inside of the candidate presentation image is executed by performing different image processes in an area inside the image corresponding to a main subject or a candidate image and the remaining area.

(10)

The display control device according to any one of (1) to (9), wherein the display image processing unit acquires the candidate image information and the main subject information from an external image processing device.

(11)

The display control device according to any one of (1) to (9), further including:

a main subject determination unit configured to detect candidate images serving as candidates for a main subject from a plurality of frames of image data and to determine a main subject among the detected candidate images, wherein the display image processing unit acquires the candidate image information and the main subject information from the main subject determination unit.

(12)

The display control device according to (11), wherein the main subject determination unit obtains a degree of stable presence for each of the detected candidate images within the image data spanning the plurality of frames, and determines a main subject among the candidate images using the degree of stable presence.

REFERENCE SIGNS LIST 1 display control unit
1a display image treating unit
1b display data output unit
2 main subject determination unit
4 display unit
10 imaging apparatus
11 optical system
12 imager
13 optical system drive unit
14 sensor unit
15 recording unit
16 communication unit
20 digital signal processing unit
21 pre-processing unit
22 synchronization unit
23 YC generation unit
24 resolution conversion unit
25 codec unit
26 candidate detection unit
27 subject extraction map generation unit
30 control unit
34 display unit
35 manipulation unit
70 computer device
71 CPU

The invention claimed is:

1. A display control device, comprising:
circuitry configured to
perform a main subject determination process including
a first stage to identify a candidate set of objects in a displayed image as candidates for selection as a main subject, each object in the candidate set being highlighted with a predetermined highlight in the displayed image, and
a second stage to select one object from the candidate set of objects as a potential main subject, the one object selected as a potential main subject being highlighted in the displayed image with a first flickering highlight,
perform a main subject decision process to decide that the one object selected as a potential main subject is to be set as the main subject based on predetermined criteria and set the one object as the main subject, and
highlight in the display image the one object that is set as the main subject with a second flickering highlight that differs from the first flickering highlight.

2. The display control device according to claim 1, wherein the predetermined highlight is a solid-line square, the first flickering highlight is a flickering solid-line square, and the second flickering highlight is a flickering bold solid-line square.

3. The display control device according to claim 1, wherein in the first stage of the main subject determination process, the circuitry is further configured to identify the candidate set of objects using facial recognition or body recognition.

4. The display control device according to claim 1, wherein the predetermined criteria is a degree of stable presence, and in the main candidate decision process, the one object decided to be set as the main subject has a highest degree of stable presence.

5. The display control device according to claim 4, wherein the circuitry is further configured to determine the degree of stable presence based on object positions within each of a plurality of successive images.

6. The display control device according to claim 5, wherein the circuitry is further configured to determine the degree of stable presence based on distances between the object positions and a predetermined image point within each of the plurality of successive images.

7. A display control process, comprising:
performing, with circuitry, a main subject determination process including
identifying, with the circuitry and in a first stage, a candidate set of objects in a displayed image as candidates for selection as a main subject, each object in the candidate set being highlighted with a predetermined highlight in the displayed image, and
selecting, with the circuitry and in a second stage, one object from the candidate set of objects as a potential main subject, the one object selected as a potential main subject being highlighted in the displayed image with a first flickering highlight;
performing, with the circuitry, a main subject decision process to decide that the one object selected as a potential main subject is to be set as the main subject based on predetermined criteria and setting the one object as the main subject; and
highlighting, with the circuitry and in the display image, the one object that is set as the main subject with a second flickering highlight that differs from the first flickering highlight.

8. A non-transitory computer-readable medium storing computer-readable instructions that, when executed by a processor, cause the processor to perform a method comprising:
performing a main subject determination process including
identifying, in a first stage, a candidate set of objects in a displayed image as candidates for selection as a main subject, each object in the candidate set being highlighted with a predetermined highlight in the displayed image, and selecting, in a second stage, one object from the candidate set of objects as a potential main subject, the one object selected as a potential main subject being highlighted in the displayed image with a first flickering highlight;

performing a main subject decision process to decide that the one object selected as a potential main subject is to be set as the main subject based on predetermined criteria and setting the one object as the main subject; and highlighting in the display image the one object that is set as the main subject with a second flickering highlight that differs from the first flickering highlight.

* * * * *